Nov. 11, 1952 J. O'D. SHEPHERD 2,617,888

LINE LOCKOUT ARRANGEMENT

Filed April 1, 1950 9 Sheets-Sheet 1

INVENTOR
J. O. SHEPHERD
BY H. A. Patterson
ATTORNEY

INVENTOR
J. O. SHEPHERD
BY
[signature]
ATTORNEY

Nov. 11, 1952

J. O'D. SHEPHERD 2,617,888

LINE LOCKOUT ARRANGEMENT

Filed April 1, 1950

9 Sheets-Sheet 3

INVENTOR
J. O. SHEPHERD
BY
H. A. Patterson
ATTORNEY

INVENTOR
J. O. SHEPHERD
BY H. A. Patterson
ATTORNEY

INVENTOR
J. O. SHEPHERD
BY H. A. Patterson
ATTORNEY

LINE LOCKOUT ARRANGEMENT

Filed April 1, 1950 9 Sheets-Sheet 6

INVENTOR
J. O. SHEPHERD
BY H. A. Patterson
ATTORNEY

Nov. 11, 1952    J. O'D. SHEPHERD    2,617,888

LINE LOCKOUT ARRANGEMENT

Filed April 1, 1950    9 Sheets-Sheet 7

INVENTOR
J. O. SHEPHERD
BY
ATTORNEY

INVENTOR
J. O. SHEPHERD
BY H. A. Patterson
ATTORNEY

INVENTOR
J. O. SHEPHERD
BY H. A. Pattison
ATTORNEY

Patented Nov. 11, 1952

2,617,888

UNITED STATES PATENT OFFICE 2,617,888

LINE LOCKOUT ARRANGEMENT

Judson O'D. Shepherd, Atlanta, Ga., assignor to American Telephone and Telegraph Company, a corporation of New York Application April 1, 1950, Serial No. 153,453

14 Claims. (Cl. 179—22)

The present invention relates generally to automatic telephone systems and more particular to circuit means effective automatically at times for preventing calling lines from initiating automatic switch interconnections.

In automatic systems wherein subscribers' lines and trunks terminate in switches, such as cross-bar switches, it is of course desirable to prevent double connections, which might occur if two such lines should set up a calling condition simultaneously or concurrently.

One of the main objects of the present invention is to provide circuit means associated with the line circuits of such lines which means are effective automatically, when a plurality of lines set up calling conditions concurrently, to prevent any one of such lines from effecting switching operations until such one line disconnects.

In such automatic systems as are contemplated by the utility of the present invention, whenever a calling line effects a switch interconnection such interconnection is arranged through or under the control of link circuits. These link circuits are seized by calling lines for the purpose of completing the desired interconnection, such interconnection, depending upon the nature thereof, as will be apparent from subsequent description, using said links either only to set up the interconnection whereupon such links are released or to control the interconnection throughout the ensuing conversation period.

Another main object of the present invention is to provide circuit means associated with said links and with said lines which means are effective automatically, when all available links are busy, to prevent any calling line from effecting switching operations until such calling line disconnects.

Other features, objects and purposes of the present invention will be apparent from the subsequent detailed description of a preferred embodiment thereof.

The present invention is shown and described herein as embodied in a small, simple community dial cross-bar office. Subscribers' lines and trunks, either incoming or outgoing, are terminated in verticals of a cross-bar switch; and, link circuits are terminated in horizontals of the same switch. Each link circuit occupies two horizontal units of the cross-bar switch in order to complete interconnections between lines terminating in the same switch. A common start circuit is provided for all links: this start circuit is under the control of lock-out relays in the various line circuits and of link assignment relays associated with the various link circuits. According to the invention, if two or more lines should be placed concurrently into calling condition, the lock-out relays of all such lines will be operated thereby to prevent any one of such lines from controlling or attempting to control the start circuit until such line disconnects and reinitiates a call. Likewise, according to the invention, should all links be busy when any line is placed into a calling condition, the link assignment relays associated with such links will operate the lock-out relay of such line, thereby to prevent such line from controlling or attempting to control the start circuit until such line disconnects.

The present invention, outlined above, will be described in detail hereinafter in connection with the drawings which may be described generally as follows.

GENERAL DESCRIPTION

Figure 1:
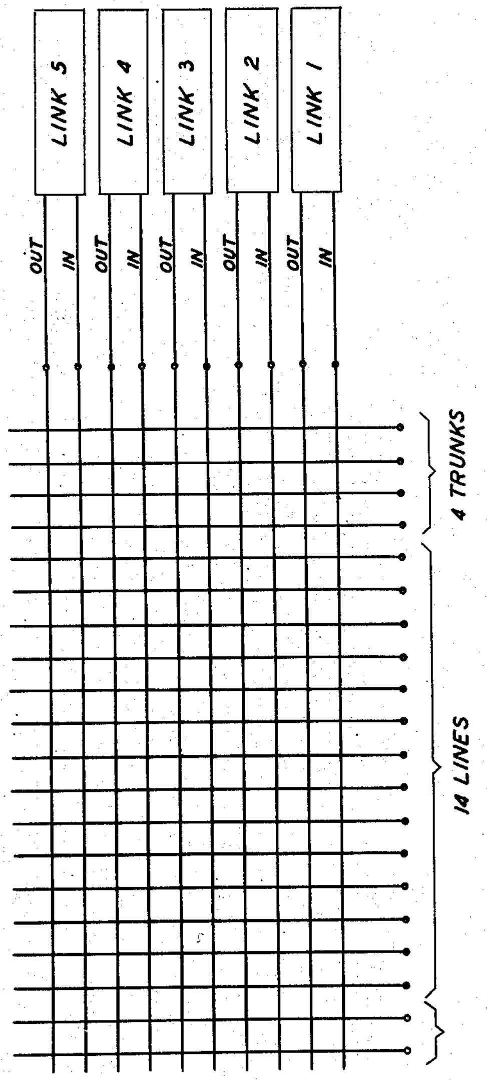
Fig. 1 shows diagrammatically a cross-bar switch unit with four trunk lines and fourteen subscribers' lines terminated in verticals thereof and five link circuits terminated in the ten horizontals thereof.
Figure 2:
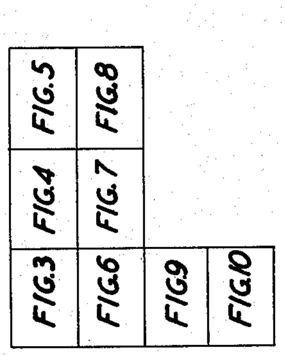
Figure 3:
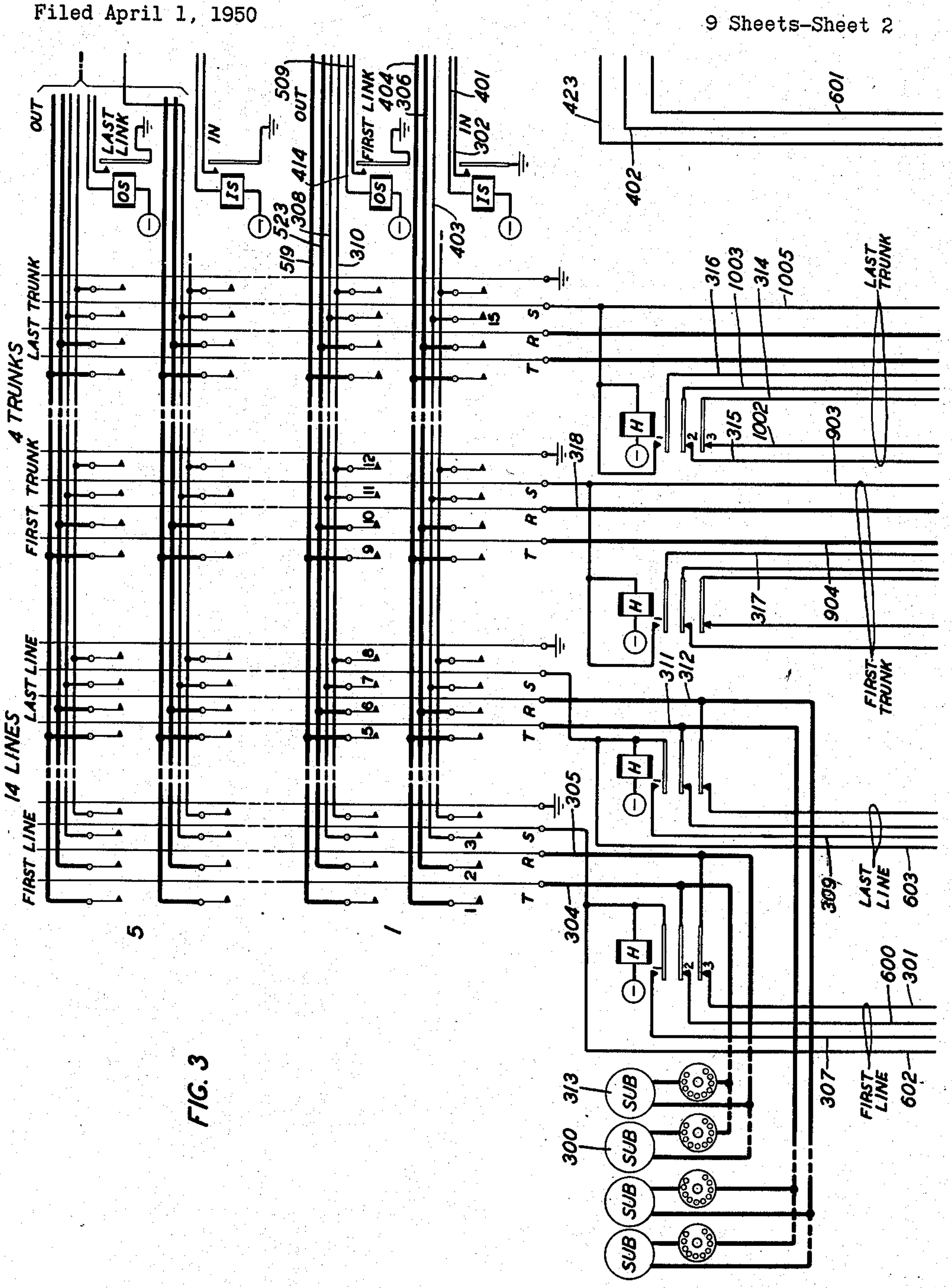
Fig. 3 shows four verticals and four horizontals, with associated hold and select magnets, of a cross-bar switch unit whereon are shown a first and a last subscriber's line and trunk line, and with line circuit terminations.
Figure 4:
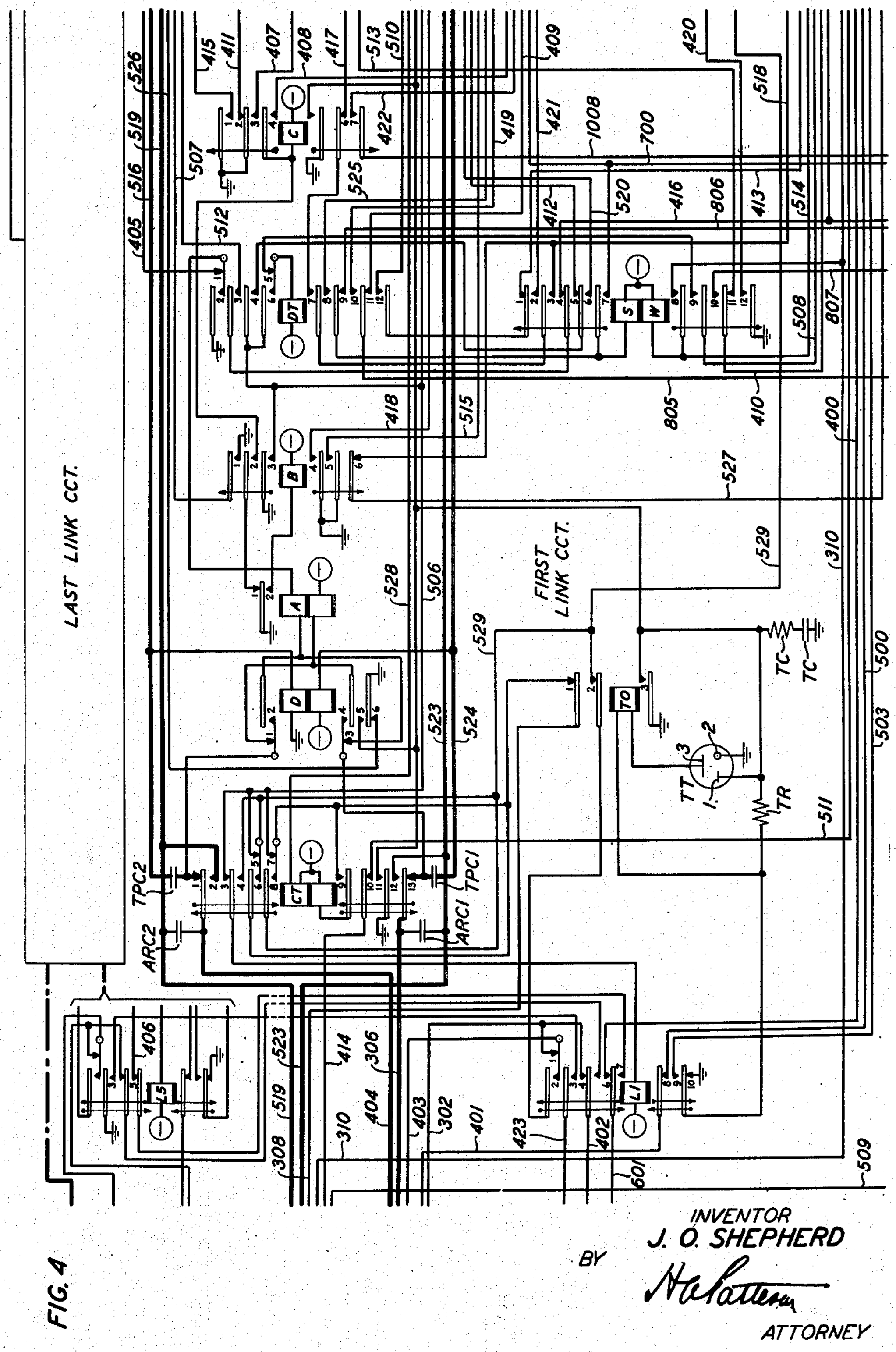
Figs. 4, 5, 7 and 8 show a first and a last link circuit, the first link circuit being shown in detail.
Figure 5:
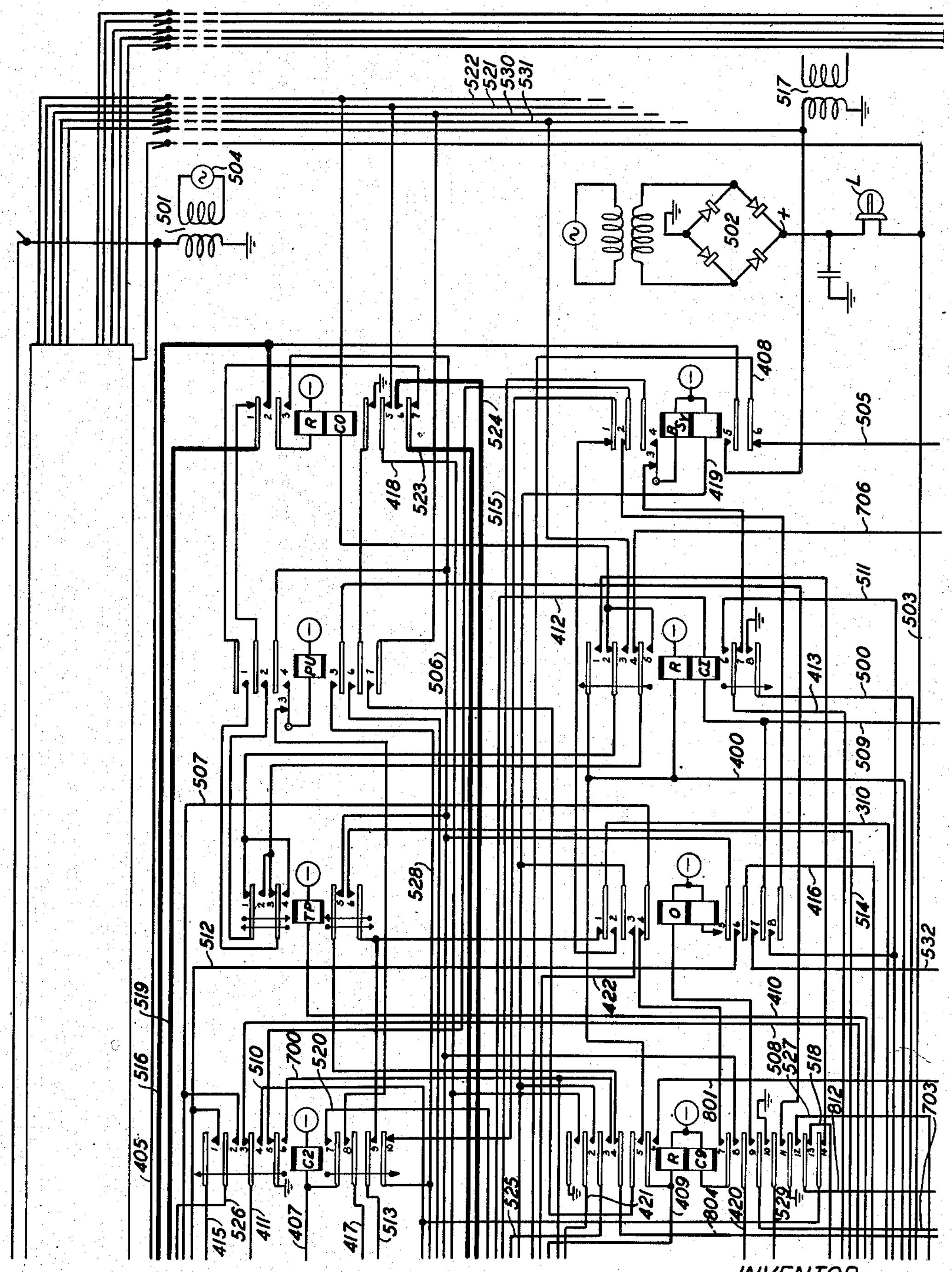

The representation in Fig. 1 diagrammatically illustrates a cross-bar switch unit comprising twenty vertical units and ten horizontal units. A pluraility of subscribers' lines are terminated on some of the verticals and a plurality of trunk circuits are terminated on other verticals. Thus the hold magnets corresponding to these verticals also correspond to the associated trunks and subscribers' lines and will, when operated in conjunction with a select magnet, effect an interconnection between such line or trunk and a horizontal unit of the switch, as is well known. The ten horizontal units of the switch are associated with five link circuits on a paired basis. That is, each link is terminated in two horizontal units designated "In" and "Out" in Fig. 1. Each of these horizontal units is, as is also well known, under the control of a corresponding select magnet which, when operated, conditions the associated horizontal unit to be interconnected, under the control of a hold magnet, with any vertical unit on the switch corresponding to said hold magnet.

When a call is originated by one of the subscribers' lines or is incoming over one of the trunks, an idle link circuit is assigned to the call. Interconnection between the line or trunk and such link is accomplished over the "In" unit of said link. These types of calls use the link until disconnection occurs. When the link knows the destination of the call (either to a line or to a trunk), the link, after testing that such path is idle, connects therewith by means of the "Out" unit of said link.

In the event of a reverting call (a call between subscribers on the same line terminating in the switch), a link is seized by means of its "In" unit. The link effects the interconnection of the parties over such unit and then releases. Thus, this type of call does not use the link except to control the interconnection.

For calls between subscribers of different lines terminating in this switching unit, a three-digit number system is suggested. The first two digits designate and identify the number of the line called. The third digit identifies the type of ringing required and the side of the line to which it is to be applied. An arbitrary numbering system has been chosen to illustrate the principles of the present invention as embodied in a system having fourteen lines, four trunks, and five links. The numbering plan in the assumed case is as follows:

| | | | |
|---|---|---|---|
| Line 1—81 | Line 5—75 | Line 8—71 | Line 12—85 |
| Line 2—72 | Line 6—76 | Line 9—82 | Line 13—87 |
| Line 3—73 | Line 7—77 | Line 10—83 | Line 14—86 |
| Line 4—74 | | Line 11—84 | |

The reasons why such system has been chosen as preferable, while being arbitrary, will be discussed somewhat hereinafter. On an eight-party semiselective basis this unit can handle calls to, from, and between some 112 individual subscribers whose lines terminate in this switching unit. In order to indicate to a subscriber when he is being called, four ringing codes are employed to be applied to the tip or ring side of the line to select one out of eight possible subscribers on that line. These codes will be selected by the third digit which may be one of the digits 1, 2, 3, and 4.

Where the central office which serves this switching unit is a manual office (the trunks terminating at the unit extend to a manual office), calls originated by subscribers to operators will be accomplished by the dialing of just one digit, a zero.

Where the central office to which this swtiching unit is connected is a dial office, an operator thereat may be reached by dialing zero, followed by another zero when the automatic equipment at such office is ready for this second directing digit zero. A subscriber in the aforesaid dial office may be reached by the switching unit subscriber dialing a zero followed by the number of the desired subscriber.

Calls from one switching unit to another through a dial central office are accomplished by dialing zero, followed by a code directing an extension of the connection to the desired switching unit, and followed by the three digits identifying the desired subscriber's line and ringing condition thereat.

The description set forth hereinafter as a disclosure of a preferred embodiment of the present invention will provide detailed descriptions of the following four types of calls, with, of course, other descriptive matter relating to details common to all such calls and relating to differences as well:

(1) Local call—Different lines
(2) Reverting call
(3) Trunk call—Incoming
(4) Trunk call—Outgoing

LOCAL CALL—DIFFERENT LINES—SAME SWITCHING UNIT

*Line finding*

Figure 6:
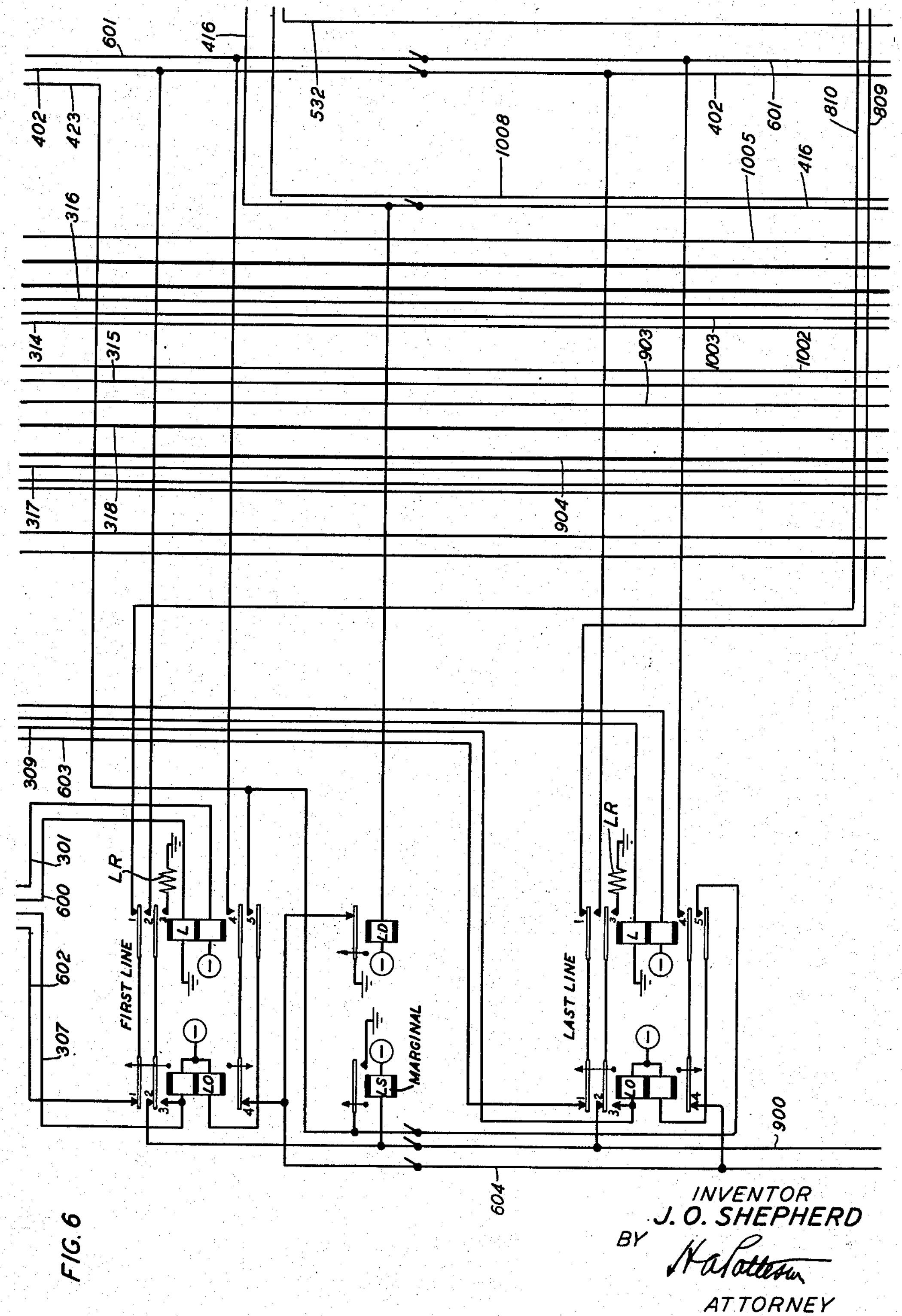
Fig. 6 shows line circuits for the first and last subscribers' lines.

When a subscriber, say subscriber 300, initiates a call by removing his receiver from its normal position, a circuit is closed for operating the line relay L(6) of the first line (the symbol L(6) means relay L in Fig. 6). Relay L(6) of the first line operates in a circuit extending from ground, through the upper winding of relay L(6), conductor 600, contact 2 of hold magnet H(3) of the first line, tip conductor 304, over the closed subscriber loop, ring conductor 305, contact 3 of hold magnet H(3), conductor 301, to battery through the lower winding of line relay L(6). Relay L(6) of the first line circuit, upon operating, closes a start circuit over conductor 601 to operate relay RCI(5) of the first link circuit in a circuit extending from ground, over the contact of the line delay relay LD(6), contact 4 of the lock-out relay LO(6) of the first line, contact 4 of relay L(6), conductor 601, contact 6 of the link assignment relay L1(4) of the first link, conductor 400, to battery through the upper winding of relay RCI(5).

If the first link had been busy, relay L1(4) would have been operated, as will be explained hereinafter. In that situation, the circuit last traced for operating relay RCI(5) of the first link would have been switched over contact 7 of the operated relay L1(4), to a chain of such relays L1(4) to L5(4), and over a contact corresponding to contact 6 of relay L1(4) of the first unoperated relay to the group L2 (not shown) to L5(4) to operate the relay RCI (not shown) of the first idle link.

In the event that all links are busy then all of the relays L(4) to L5(4) will be operated. The above start circuit extending over conductor 601 would be open at the last relay, such as L5(4), and another circuit would be established for operating the lock-out relay LO(6) of the calling line. This circuit may be traced from ground, over contact 3 of relay L5(4), over front contacts of relays L4 to L2 (not shown), contact 3 of relay L1(4), conductor 423, contact 5 of relay L(6), to battery through the lower winding of relay LO(6). Relay LO(6) operates and locks over its contact 3, contact 3 of relay L(6), to ground through resistance LR(9). The operation of relay LO(6) opens, at its contact 4, the above-traced start circuit. Thus, until subscriber 300 disconnects, to thereby release relay L(6), such subscriber's line circuit cannot again attempt to seize an idle link circuit.

It will be assumed, for the purposes of the present discussion, that the first link is idle and that therefore relay L1(4) is released, permitting relay RCI(5) to operate as above described. Relay RCI(5), upon operating, operates the select magnet IS(3), associated with the "In" horizontal unit of the first link, in a circuit extending from ground, over contact 8 of relay RCI(5), conductor 500, contact 8 of relay LI(4), conductor 401, to battery through the winding of select magnet IS(3). Select magnet IS(3), upon operating, operates the hold magnet H(3) associated with the calling subscriber's line in a circuit extending from ground, over the contact of select magnet IS(3), conductor 302, contact 4 of relay LI(4), conductor 402, contact 2 of relay L(6) of the first line, contact 1 of the lock-out relay LO(6) of the first line, conductor 602, to battery through the winding of hold magnet H(3). The operation of hold magnet H(3) closes the cross-points determined by the operation of the select and hold magnets described thereby to interconnect the calling first line with the first link over the "In" termination of said link. Hold magnet H(3) locks to ground supplied over the contact of select magnet IS(3), conductor 302, contact 1 of relay LI(4), sleeve conductor 403 of the switching unit, contact 3 of the cross-points, to battery through the winding of hold magnet H(3).

Hold magnet H(3) upon operating, releases the line relay L(6) of the first line, leaving the hold magnet H(3) locked operated as above described. The operation of hold magnet H(3) operates the lock-out relay LO(6) of the first line in a circuit extending from ground on the sleeve 403 of the switching unit, over contact 3 of the cross-points, contact 1 of hold magnet H(3), conductor 307, to battery through the upper winding of relay LO(6) of the first line.

When the cross-points of the switch are closed, relay A(4) of the first link operates in a circuit extending from battery, through the lower winding of relay A(4), contact 1 of relay D(4), contact 1 of the cut-through relay CT(4), tip conductor 404, contact 1 of the cross-points, tip conductor 304 of the calling first line, over the line loop, ring conductor 305, contact 2 of the cross-points, ring conductor 306, contact 13 of cut-through relay CT(4), contact 3 of relay D(4), through the upper winding of relay A(4), contact 1 of the dial tone relay DT(4), conductor 405, to ground through the left winding of the dial tone transformer 501. Relay A(4), upon operating, operates relay B(4) in an obvious circuit over contact 2 of relay A(4).

Relay B(4), upon operating, completes a circuit for providing off-normal ground at its contact 3. This off-normal ground operates the link assignment relay LI(4) in a circuit over contact 3 of relay CT(4), to battery through the winding of relay LI(4). Relay LI(4), upon operating, transfers at its contact 7, as above described, the circuit over conductor 601 which operated relay RCI(5) so that the next call, if any, will operate the relay RCI (not shown) of the next idle link circuit. Relay LI(4), upon operating, also connects the sleeve conductor 403 if the switch to off-normal ground over its contact 2, contact 2 of the time-out relay TO(4), conductor 529, contact 5 of relay CT(4), and over contact 3 of relay B(4).

Line relay L(6) of the first line, upon releasing, as above described, opens the operating circuit for relay RCI(5), which relay however, is slow-releasing and will not release until relay LI(4) has operated to apply off-normal ground to the sleeve conductor 403 of the switch. Upon the operation of relay LI(4), the select magnet IS(3) is released, leaving the connected cross-points of the switch under the sole control of hold magnet H(3).

*Simultaneous calls lock-out*

If two or more lines are placed in a calling condition simultaneously two or more line relays L(6) will be operated at the same time, such as relay L(6) for the first line and relay L(6) for the last line. Each relay L(6), upon operating, completes a circuit from ground, through its associated resistance LR(6), over its contact 3, contact 2 of the associated lock-out relay LO(6), to battery through the winding of the marginal line supervisory relay LS(6). Relay LS(6) will not operate if only one resistance LR(6) is in series therewith, but will operate if two or more such resistances LR(6) are in parallel because of two or more simultaneously operated line relays L(6). If two or more lines, say the first line and the last line, operate their relays L(6) concurrently, relay LS(6) will operate. Relay LS(6), upon operating, completes circuits for operating the lock-out relays LO(6) of all lines which are in a calling condition (relays L(6) operated) extending from ground, over the contact of relay LS(6), contact 5 of each relay L(6) which is operated, to battery through the lower windings of the associated lock-out relays LO(6). Those relays LO(6), which are thereby operated, are locked in circuits extending from ground, through resistance LR(6), contact 3 of relay LO(6), to battery through the upper winding of relay LO(6). The operation of these relays LO(6) releases relay LS(6). These operated relays LO(6) open, at their contacts 4, the previously traced start circuit over conductor 601 for each such line. Until a calling subscriber disconnects to release its lock-out relay LO(6), this lock-out condition prevents each such subscriber from being able to effect a connection with a link circuit. It will now be assumed that there is no simultaneous call situation involved.

*Link time-out*

It will be recalled that the holding ground on the sleeve conductor 403 of the switch is under the control of contact 2 of the time-out relay TO(4). The time-out relay TO(4), if operated, would remove this holding ground and release the connection between the calling first line and the first link. Before relay LI(4) operated, as above described, condenser TC(4), if charged, was discharged in a circuit extending from ground, through condenser TC(4), resistance TC(4), resistance TR(4), to ground over contact 10 of relay LI(4). When relay LI(4) was operated, as above described, the ground on contact 10 of relay LI(4) was replaced by a high positive voltage (say about 130 volts of positive direct-current voltage) from the rectifier bridge 502, through lamp L(5), conductor 503, to resistance TR(4) over contact 9 of relay LI(4). Condenser TC(4) begins to acquire a charge in this circuit and the values of resistances TR(4) and TC(4) and condenser TC(4) are such that, if allowed to charge for about eight seconds (for illustration), condenser TC(4) will have acquired a charge sufficient to cause ionization of gas tube TT(4) between electrodes 1 and 2 thereof. Such ionization will effect a discharge across tube TT(4) from ground, electrode 2 to electrode 3, winding of relay TO(4), contact 9 of relay LI(4), conductor 503 to positive voltage. Relay TO(4)

will thereupon operate to discharge condenser TC(4) over its contact 3.

When relay TO(4) operates, it opens, at its respective contacts 1 and 2, the sleeve conductors 308 and 403 of the "Out" and "In" units of the switch corresponding to the first link. The opening of such sleeve conductors 308 and 403 will of course release any operated hold magnets locked to ground on such conductors thereby releasing the connection, if any. Relay TO(4) will remain operated until relay LI(4) releases.

There are many ways in which condenser TC(4) may be discharged before it acquires a charge sufficient to fire tube TT(4). Tube TT(4) is arranged to be fired only if there has been excessive delay between various circuit operations. As will be apparent from subsequent description, the operation of any one of the relays CT(4), D(4), C(4), or PU(5) with relay RCO(5) released, will discharge condenser TC(4) to prevent a time-out.

If a time-out occurs, the hold magnet, such as hold magnet H(3) for the first line, will release, thereby reoperating the associated line relay L(6). Relay L(6), upon reoperating, will lock operated the lock-out relay LO(6) over contact 3 of the latter to ground over contact 3 of relay L(6) and through resistance LR(6), relay LO(6) being slow releasing to permit the reoperation of the line relay L(6) to lock relay LO(6) operated before the latter can release upon the release of the associated hold magnet H(3). Relays A(4) and B(4) of the link circuit, if operated as previously described, will of course release, with the release of the switch interconnection, to thereby release relay LI(4).

If a call is abandoned at such a time as condenser TC(4) may have acquired a partial charge, the release of relay LI(4), above described, will, at its contact 10, discharge condenser TC(4).

Under normal procedure of a call, the time-out arrangement will be disabled by the operation of one or more of the above-mentioned relays CT(4), D(4), C(4), or PU(5) with relay RCO(5) released. It will be assumed that the sequence of circuit operation is timely, thereby to preclude a time-out as above described.

*Line lock-out*

After the calling line has been found, relay LO(6) will be operated as previously described. The operation of relay LO(6) with relay L(6) released, opens at contact 1 of relay LO(6), the circuit to be described later for operating the hold magnet of the associated line when called, thereby making the first line busy, and opens at contacts 4 of relays LO(6) and L(6) the start circuit, previously traced over conductor 601, for seizing a link.

*First digit dialed*

When the calling first line subscriber 300 was connected to the first link and relays A(4) and B(4) operated, as above described, dial tone was supplied to subscriber 300 in a circuit extending from ground, through the left winding of dial tone transformer 501 (which, it will be understood, picks up dial tone supplied by the source thereof 504 through the right winding of transformer 501), over conductor 405, contact 1 of relay DT(4), upper winding of relay A(4), contact 3 of relay D(4), contact 13 of relay CT(4), ring conductor 306, contact 2 of the switch, to ring conductor 305 of the calling line and thence back to battery through the lower winding of relay A(4) as previously traced.

Let it be assumed that the called number is "863," where, it will be recalled, the first two digits 86 represent the number of the called line and the last digit 3 represents the ringing code applicable to the desired party on that line 86.

Upon the first open line period (the first pulse of the first digit as the dial restores to normal), relay A(4) releases. Relay B(4) is slow-releasing and will not release during pulses of a digit when relay A(4) is released. Relay C(4) operates in a circuit extending from ground, over contact 1 of relay A(4), contact 2 of relay B(4), to battery through the winding of relay C(4). Relay C(4), upon operating, operates relay C2(5) in a circuit extending from ground, over contact 3 of relay C(4), conductor 407, to battery through the winding of relay C2(5). Relay C(4), upon operating, extends its operating ground over its contact 4, conductor 408, contact 6 of busy relay BSY(5), conductor 505, contacts 3 of relays S3(7), S2(7) and S1(7), to battery through the winding of relay 1(7), which relay thereupon operates. At this time it will be noted that the operating ground for relay 1(7) is extended over contact 4 of relay 1(7) to the left side of the winding of relay S1(7), and the right side of the winding of relay S1(7) is grounded over contact 1 of relay S2(7), conductor 700, and contact 6 of relay C2(5). Thus relay S1(7) cannot operate.

At the end of the first open line period (the first pulse), relay A(4) reoperates thereby opening the operating circuits for relays C(4) and 1(7), above traced. Relay C(4) is a slow-releasing relay which will remain operated between pulses of any digit but will release between digits as will be explained. As soon as the operating ground is removed from relay 1(7), relay S1(7) operates in series therewith in a circuit extending from ground, over contact 6 of relay C2(5), conductor 700, contact 1 of relay S2(7), winding of relay S1(7), contact 4 of relay 1(7), to battery through the winding of relay 1(7).

Upon the second open line period (the second pulse), relay A(4) again releases completing the same circuit from ground, over contact 1 of relay A(4), contact 2 of relay B(4), contact 4 of relay C(4), conductor 408, contact 6 of relay BSY(5), to conductor 505, as before. Ground on conductor 505 is extended over contacts 3 of relays S3(7) and S2(7), contact 2 of relay S1(7), contact 5 of relay 1(7), to battery through the winding of relay 2(7). Relay 2(7) operates to extend its operating ground over its contact 3 to the left side of the winding of relay S2(7). Relay S2(7) cannot operate because the right side of its winding is grounded over contact 1 of relay S3(7), conductor 700, and contact 6 of relay C2(5).

At the end of the second open line period (the second pulse), relay A(4) reoperates thereby opening the operating circuit of relay 2(7) by removing ground from conductor 505. Relay S2(7) now operates in series with relay 2(7) over a circuit extending from battery, through the winding of relay 2(7), contact 3 of relay 2(7), winding of relay S2(7), contact 1 of relay 3(7), conductor 700, to ground over contact 6 of relay C2(5). Relay S2(7), upon operating, opens, at its contact 1 the operating circuit for relays S1(7) and 1(7), which relays thereupon release.

Upon the third open line period (the third pulse), relay A(4) again releases to again ground conductor 505 as before. This ground is extended over contact 3 of relay S3(7), contact 2 of relay S2(7), contact 4 of relay 2(7), to battery through the winding of relay 3(7). Relay 3(7) operates, extending its operating ground over its contact 4 to the left side of the winding of relay S3(7), the right side of the winding of relay S3(7) being grounded over contact 1 of relay S1(7), conductor 700, and over contact 6 of relay C2(5).

At the end of the third open line period (the third pulse), relay A(4) reoperates to remove ground from conductor 505 thereby to permit relay S3(7) to operate in series with relay 3(7). Relay S3(7), upon operating, releases relays S2(7) and 2(7) by opening, at contact 1 of relay S3(7), the operating circuit thereof.

Upon the fourth pulse, relay A(4) releases to again apply ground to conductor 505. This ground extends over contact 2 of relay S3(7), contact 5 of relay 3(7), to battery through the winding of relay 4(7), which relay thereupon operates.

At the end of the fourth pulse, relay A(4) reoperates to remove ground from conductor 505 thereby permitting relay S1(7) to operate in series with relay 4(7) in a circuit extending from battery, through the winding of relay 4(7), contact 3 of relay 4(7), winding of relay S1(7), contact 1 of relay S2(7), conductor 700, to ground over contact 6 of relay C2(5). Relay S1(7), upon operating, releases relays S3(7) and 3(7).

During the fifth pulse, relay A(4) releases to apply ground to conductor 505 and then reoperates to remove ground from said conductor. Ground on conductor 505 extends over contacts 3 of relays S2(7) and S3(7), contact 2 of relay S1(7), contact 4 of relay 4(7), conductor 701, to battery through the winding of relay 5(8). Relay 5(8) operates and, upon the removal of ground from conductor 505 at the end of the fifth pulse, relay S2(7) is operated in series with relay 5(8) over contact 4 of relay 5(8), conductor 800, winding of relay S2(7), to ground over contact 1 of relay S3(7) and conductor 700 as previously described. The operation of relay S2(7) releases relays S1(7) and 4(7).

During the sixth pulse, ground on conductor 505 will be extended over contact 3 of relay S3(7), contact 2 of relay S2(7), conductor 702, contact 5 of relay 5(8), to battery through the winding of relay 6(8), which relay thereupon operates. When ground is removed from conductor 505 at the end of the sixth pulse, relay S3(7) operates in series with relay 6(8), thereby releasing relays S2(7) and 5(8).

During the seventh pulse, ground on conductor 505 is extended over contact 2 of relay S3(7), conductor 703, contact 4 of relay 6(8), to battery through the winding of relay 7(8), which relay operates. When ground is removed from conductor 505 at the end of the seventh pulse (when relay A(4) reoperates), relay S1(7) operates in series with relay 7(8) over contact 5 of relay 7(8), conductor 802, winding of relay S1(7), to ground over conductor 700, as previously described. The operation of relay S1(7) releases relays S3(7) and 6(8). Relay 7(8), upon operating, completes a circuit for operating relay SW(4) extending from ground, over contact 6 of relay C2(5), conductor 700, contact 1 of relay 7(8), conductor 806, contact 9 of relay DT(4), to battery through the upper winding of relay SW(4). Relay SW(4) operates and locks to ground on conductor 700 over its contact 7. When relay SW(4) operates, a circuit is completed extending from ground, over contact 3 of relay 7(8), conductor 807, contact 10 of relay SW(4), conductor 410, to battery through the winding of relay TP(5). Relay TP(5) may momentarily operate in the latter circuit; but, since the function of relay TP(5) is to switch the ringing ground from one side of the called line to the other, depending upon the ringing code dialed (third digit), the operation of relay TP(5) has no effect at this time, and such relay will release during the recording of the eighth pulse, if any.

During the eighth pulse, ground on conductor 505 is extended over contacts 3 of relays S3(7) and S2(7), contact 2 of relay S1(7), conductor 704, contact 6 of relay 7(8), to battery through the upper winding of relay 8(8), which relay thereupon operates. When ground is removed from conductor 505 at the end of the eighth pulse, relay S2(7) operates in series with relay 8(8) over contact 17 of relay 8(8), conductor 800, winding of relay S2(7), contact 1 of relay S3(7), conductor 700, to ground over contact 6 of relay C2(5). The operation of relay S2(7) releases relays S1(7) and 7(8), the latter thus releasing relay TP(5). Relay 8(8) locks also through its lower winding, contact 16 of relay 8(8), conductor 804, contact 4 of relay RC9(5), contact 5 of relay TP(5), conductor 506, to off-normal ground over contact 3 of relay B(4).

During the ninth pulse, ground on conductor 505 is extended over contact 3 of relay S3(7), contact 2 of relay S2(7), conductor 702, contact 18 of relay 8(8), conductor 805, contact 11 of relay DT(4), conductor 409, to battery through the upper winding of relay RC9(5), which relay operates and locks through its lower winding, contact 7 of relay RC9(5), contact 4 of relay 0(5), conductor 507, to ground over contact 1 of relay B(4). Relay RC9(5), upon operating, opens the above-traced locking circuit through the lower winding of relay 8(8). When ground is removed from conductor 505 at the end of the ninth pulse, relay S3(7) operates in series with the upper winding of relay RC9(5) over contact 6 of relay RC9(5), conductor 801, winding of relay S3(7), conductor 700, to ground over contact 6 of relay C2(5). Relay S3(7), upon operating, releases relays S2(7) and 8(8).

During the tenth pulse, ground on conductor 505 is extended over contact 2 of relay S3(7), conductor 703, contact 9 of relay RC9(5), to battery through the upper winding of relay 0(5). Relay 0(5) operates and locks through its lower winding, contact 5 of relay 0(5), conductor 506, to off-normal ground over contact 3 of relay B(4). The operation of relay 0(5) releases relays RC9(5) and S3(7). When ground is removed from conductor 505 at the end of the tenth pulse (when relay A(4) reoperates), relays 0(5) and SW(4) remain operated.

Thus at the end of each pulse of the first digit (at the instant relay A(4) reoperates) the following chart shows what relays are then operated with reference to the digit dialed:

| First Digit | Relays Operated | First Digit | Relays Operated |
|---|---|---|---|
| 1 | S1 (7)—1 (7) | 6 | S3 (7)—6 (8) |
| 2 | S2 (7)—2 (7) | 7 | S1 (7)—7 (8)—SW (4)—TP (5) |
| 3 | S3 (7)—3 (7) | 8 | S2 (7)—8 (8)—SW (4) |
| 4 | S1 (7)—4 (7) | 9 | S3 (7)—RC9 (5)—SW (4) |
| 5 | S2 (7)—5 (8) | 0 | 0 (5)—SW (4) |

It will be recalled that it was assumed that the called line and station connected thereto were to be identified by the three digits 863. Thus, at the end of the eighth pulse of the first digit, when relay A(4) reoperated, relays S2(7), 8(8) and SW(4) were operated. When relay A(4) remains operated after the end of the eighth pulse, relay C(4) releases, thereupon releasing relay C2(5) after the release delay time of the latter. Upon the release of relays C(4) and C2(5), relay DT(4) operates in a circuit extending from ground, over contact 2 of relay C(4), conductor 411, contact 3 of relay C2(5), conductor 508, contact 9 of relay SW(4), contact 5 of relay DT(4), to battery through the winding of relay DT(4). Relay DT(4) operates and locks over its contact 6 to off-normal ground over contact 3 of relay B(4). Relay DT(4), upon operating, replaces dial tone ground on its contact 1 by solid ground over its contact 2, previously traced to the ring side of the calling subscriber's line. When relay C2(5) released, the holding ground, over contact 6 of relay C2(5), for relay SW(4) was removed; but, relay SW(4) is sufficiently slow to release to permit relay DT(4) to operate and lock before relay SW(4) fully releases. The release of relay C2(5) also releases relay S2(7), which was operated in series with relay 8(8), the latter relay remaining operated through its lower winding under the control of relays RC9(5), TP(5), and B(4) as previously described.

*Preliminary impulses*

It will be appreciated that if any preliminary impulse, due to accident or otherwise, had been received, or if any digit less than a 7 had been dialed as a first digit, then relay SW(4) would not have operated at all since, as above described, relay SW(4) operates only upon the operation of relay 7(8) representing the counting of the digit 7. Thus, under the condition where a first digit of less than seven pulses is received, neither relay SW(4) nor relay DT(4) will be operated and dial tone will remain connected to the calling line requiring that a correct first digit be dialed if the calling subscriber desires an interconnection.

*Second digit dialed*

The second digit is assumed to be 6 in accordance with the assumed called subscriber's line and station number 863. There is a punching in Fig. 8 for each line of the switch unit. For instance punching FL(8) is for the first line, punching IL(8) for the intermediate line, and punching LL(8) for the last line. Punching FL(8) may be traced in circuit over conductor 810 to contact 1 of the line relay L(6) of the first line. Punching LL(8) may be traced in circuit over conductor 809 to contact 1 of the line relay L(6) of the last line. Likewise, the other punchings, such as IL(8), may be considered to be in similar circuits with their respective line relay contacts 1. Opposite to these line punchings are arranged some fourteen other punchings 71(8) to 77(8) and 81(8) to 87(8) connected respectively to seven back and seven front contacts of relay 8(8). As will be appreciated from subsequent description, one of the fourteen punchings will be grounded through the lower winding of relay RCI(5) depending upon the first two digits of the called number. For instance, if, as in the assumed case, the first two digits of the called number are 86, the punching 86(8) will be grounded as a result of the counting of these two successive digits. It will readily be seen that the assignment of numbers to lines is simply a matter of cross-connection between a particular line punching, say punching LL(8) for the last line, and a particular number punching, say punching 86(8), as shown by cross-connection 808.

At the end of the sixth pulse of the second digit (when relay A(4) reoperates) as above described, the counting circuit will have effected the operation of relays S3(7) and 6(8) in series, with relays C(4) and C2(5) not released yet. Upon the operation of relay 6(8) a circuit is completed for operating relay RCI(5) from ground, over contact 4 of relay DT(4), contact 5 of relay SW(4), conductor 412, lower winding of relay RCI(5), conductor 509, contact 1 of relay 6(8), contact 12 of relay 8(8), number punching 86(8), cross-connection 808, line punching LL(8) for the last line, conductor 809, contact 1 of relay L(6) of the last line, contact 1 of relay LO(6) of the last line, conductor 603, winding of hold magnet H(3) of the last line, to battery. Relay RCI(5) operates in this circuit but hold magnet H(3) does not operate due to the high resistance of the lower winding of relay RCI(5). Relay RCI(5) operates in this manner in series with each line as the pulse count progresses from 1 to 6, except where a line is busy or a line is vacant as will be explained, none of the respective hold magnets H(3) operating, however.

During the dialing of the second digit arrangements are provided for disabling the line circuits to prevent interference between such circuits, which may try to initiate an originating or incoming call, and the connection of a link circuit with a line or trunk on an outgoing call. This is provided by operating the line delay relay LD(6) common to all line circuits. The operating circuit for relay LD(6) extends from ground, over contact 1 of relay C(4), conductor 415, contact 1 of relay C2(5), conductor 512, contact 3 of relay DT(4), contact 4 of relay SW(4), conductor 416, to battery through the winding of relay LD(6), which relay thereupon operates to open, at its contact, the start circuit for all line circuits. As will be mentioned later, at the end of the second digit relay C(4) will release followed by the release of relays C2(5) and LD(6). The select and hold magnets, necessary for interconnection of the link and the called line, will be operated in the interval between the release of relay C(4) and the delayed release of relay C2(5), as will be described. The release delay time of relay LD(6) is greater than that of relay C2(5) thereby insuring that the called line is fully seized before the start circuit is again enabled.

When relay C(4) releases at the end of the second digit a circuit is completed for operating the select magnet OS(3) associated with the "Out" termination of the link. This circuit may be traced from ground, over contact 2 of relay C(4), conductor 411, contact 4 of relay C2(5), conductor 510, contact 12 of relay DT(4), contact 1 of relay SW(4), conductor 413, contact 6 of relay RCI(5), conductor 511, contact 10 of relay CT(4), conductor 414, to battery through the select magnet OS(3) associated with the "Out" termination of the first link circuit. Magnet OS(3), upon operating, extends ground over its contact, conductor 509, contact 1 of relay 6(8), contact 12 of relay 8(8), number punching 86(8), cross-connection 808, line punching LL(8)

for the last line, conductor 809, contacts 1 of relays L(6) and LO(6) of the last line, conductor 603, to battery through the winding of the hold magnet H(3) associated with the called last line to which the number 86 has been assigned by means of cross-connection 808. Hold magnet H(3) for the last line operates closing the cross-points interconnecting the last line with the first link over the "Out" termination of the latter. Hold magnet H(3) locks to ground over contact 7 of the cross-points, sleeve conductor 308, contact 1 of relay TO(4), contact 7 of relay CT(4), to off-normal ground at contact 3 of relay B(4). In order that the operating ground for the hold magnet H(3) will not shunt down relay RCI(5), the latter is locked operated by a circuit extending from ground, over contact 2 of relay C(4), conductor 411, contact 4 of relay C2(5), contact 14 of relay RC9(5), contact 1 of relay RCI(5), to battery through the upper winding of relay RCI(5).

Upon the operation of hold magnet H(3) of the last line, sleeve ground is extended over contact 1 of hold magnet H(3), conductor 309, to battery through the upper winding of the lock-out relay LO(6) associated with that line. Relay LO(6) operates to prevent this line from initiating a call.

It may be noted that the select and hold magnet operation pertaining to the selection and seizure of the called line must take place after relay C(4) releases but prior to the release of relay C2(5), a condition provided for by the slow-release delay time of relay C2(5).

Eventually relays C2(5) and LD(6) release. The release of relay LD(6), as previously indicated, again enables, at its contact, the start circuit of all line and trunk line circuits. Relay C2(5), upon releasing, releases select magnet OS(3) of the first link and releases relay RC1(5). Upon the release of relay C2(5), relay TP(5) is operated in a circuit extending from ground, contact 8 of the cross-points of the called line interconnection, conductor 310, contact 1 of relay 0(5), contact 9 of relay C2(5), conductor 513, contact 11 of relay SW(4), conductor 410, to battery through the winding of relay TP(5). Relay TP(5), upon operating, releases relay 8(8) and operates relay SW(4) in a circuit extending from ground, contact 8 of the cross-points, conductor 310, contact 1 of relay 0(5), contact 6 of relay TP(5), conductor 514, to battery through the lower winding of relay SW(4). Relay SW(4) operates and locks to ground on conductor 310 over its contact 8 and, upon operating, releases relay TP(5). Relay SW(4), upon operating, prepares the link circuit to receive the ringing code digit.

The release of relay C2(5) also releases relays S3(7) and 6(8) of the digit pulse counting circuit of the link.

*Called line busy*

If the called line had been busy the lock-out relay LO(6) thereof would have been operated as above described. In such an event, or in the event that the called line number 86 is not assigned as evidenced by an open punching 86(8), relay RCI(5) would not be operated when relay C(4) releases at the end of the second digit. It will be recalled that relay RCI(5) operates to battery through the winding of the hold magnet of an idle line, but this circuit is open at contact 1 of LO(6) if the line is busy. When relay RCI(5) fails to operate, the previously traced circuit for operating the select magnet OS(3) will be traced from the armature of relay RCI(5), over contact 7 (instead of contact 6) of relay RCI(5), contact 3 of the busy relay BSY(5), to battery through the upper winding of relay BSY(5), which relay thereupon operates and locks in a circuit over its contact 4, conductor 515, to ground over contact 5 of relay B(4). Relay BSY(5), upon operating, connects busy tone to the calling line in a circuit extending from the left winding of the busy tone transformer 517, over contact 5 of relay BSY(5), conductor 516, condenser TPC2(4), contact 1 of relay CT(4), conductor 404, contact 1 of the cross-points associated with the calling line, tip conductor 304, over the line loop, ring conductor 305, cross-point contact 2, conductor 306, contact 13 of relay CT(4), contact 3 of relay D(4), to ground through the upper winding of relay A(4) and over contact 2 of relay DT(4). This should be recognized by the calling subscriber as a directive to disconnect and to try again later.

It will be assumed that the called line is idle and has been seized as previously described.

*Third (ringing code) digit dialed*

During the dialing of the third or ringing code digit, relays C(4) and C2(5) reoperate as previously described. Relay C2(5) locks over its contact 7, conductor 520, contact 6 of relay SW(4), to off-normal ground over contact 4 of relay DT(4) and contact 3 of relay B(4). It will be recalled that the third digit in the assumed case is 3. Thus the counting chain at the end of the third digit will be in a condition where relays S3(7) and 3(7) are operated in series and are held operated by relay C2(5).

When relay C(4) releases at the end of the ringing code digit, with relay C2(5) locked operated, a circuit is completed from a ringing interrupter circuit, which provides a start signal at the beginning of each code ringing cycle, over conductor 812, over contact 13 of relay RC9(5), conductor 518, contact 3 of relay SW(4), contact 7 of relay DT(4), contact 6 of relay C(4), conductor 417, contact 8 of relay C2(5), contact 3 of the pick-up relay PU(5), to battery through the winding of relay PU(5). Upon the next grounding of conductor 812 by the ringing interrupter circuit at the beginning of a code cycle, relay PU(5) operates in the above-traced circuit and locks over its contact 4, conductor 506, to off-normal ground over contact 3 of relay B(4).

As arranged, ringing code 3 requires ringing on the tip side of the line. The ringing machine was started operating when relay B(4) operated. Such start circuit extends from ground, over contact 4 of relay B(4), conductor 418, contact 5 of the ringing cut-off relay RCO(5), over generator start conductor 521. The ringing machine will be stopped by the answer of the called party by the operation then of relay RCO(5), as will be explained. In order that the ringing shall be applied to the tip side of the called line, relay 3(7), upon operating, operates the tip party relay TP(5) in a circuit extending from ground, over contact 2 of relay 3(7), conductor 807, contact 10 of relay SW(4), conductor 419, to battery through the winding of relay TP(5).

*Called party ringing*

Ringing code digit 3 requires a certain ringing code to be applied to the tip side of the line. The code is supplied over conductor 813 from the ringing generator, contact 3 of relay 3(7), conductor 706, contact 4 of relay RCI(5), contact 2 of relay TP(5), contact 2 of relay PU(5), contact 1 of relay RCO(5), conductor 519, contact 5 of the called line cross-point contacts to the tip conductor 311 of the called line to ring the particular desired subscriber on that line. Ringing ground is supplied over conductor 522, lower winding of relay RCO(5), contact 2 of relay RCI(5), contact 4 of relay TP(5), contact 1 of relay PU(5), contact 7 of relay RCO(5), conductor 523, cross-point contact 6, to the ring conductor 312 of the called line.

Audible ringing is returned to the calling subscriber from conductor 519, through condenser ARC2(4), conductor 404, contact 1 of the calling subscriber's cross-points, to the tip conductor 304 of the calling line.

*Called party answers*

When the called party answers the closure of the line loop completes a direct-current bridge at the substation across the above alternating-current ringing circuit thereat. Relay RCO(5) will operate on the direct-current bias of said ringing current. Relay RCO(5) locks through its upper winding to off-normal ground on conductor 506 from contact 3 of relay B(4). Relay RCO(5), upon operating, disconnects, at its contact 1, the above-traced ringing current from the tip side of the called line and disconnects, at its contact 7, the ringing ground from the ring side of the calling line. A circuit is completed for operating relay D(4) extending from ground, through the upper winding of relay D(4), conductor 516, contact 2 of relay RCO(5), conductor 519, cross-point contact 5, tip conductor 311 of the called line, over the line loop, ring conductor 312 of the called line, cross-point contact 6, conductor 523, contact 6 of relay RCO(5), conductor 524, to battery through the lower winding of relay D(4). Relay D(4) operates and, in so doing, reverses at its contacts 2 and 4 the previously traced ground and battery connections to the calling party's line through the windings of relay A(4).

Talking battery is supplied to the calling line through relay A(4). Talking battery is supplied to the called line through relay D(4). The talking path may be traced from tip conductor 304 of the calling line, over cross-point contact 1, conductor 404, contact 1 of relay CT(4), condenser TPC2(4), conductor 516, contact 2 of relay RCO(5), conductor 519, cross-point contact 5, tip conductor 311 of the called line, over the called line loop, ring conductor 312 of the called line, cross-point contact 6, conductor 523, contact 6 of relay RCO(5), conductor 524, condenser TPC1(4), contact 13 of relay CT(4), conductor 306, cross-point contact 2, ring conductor 305 of the calling line, and over the calling line loop back to the tip conductor 304 of the calling line.

*Called party disconnects first*

Since the link circuits are under control of the calling party, if the called party disconnects first relay D(4) will be released to restore the normal direction of battery supply to the calling line; but, the other relays and hold magnets will remain operated until the calling party releases. Upon the release of relay D(4), ground which had been supplied to discharge condenser TC(4) over contact 5 of relay D(4), is removed to permit the link to time out and release, as has been described, if the calling party does not disconnect prior to the time-out delay time.

*Calling party disconnects*

When the calling subscriber disconnects, relay A(4) releases to in turn release the off-normal relay B(4). The release of relay B(4) effects the release of all relays of the link circuit and of both hold magnet H(3) of the calling and called lines. The link assignment relay L5(4) will be the last to release to restore the first link to availability condition.

In the event that the called subscriber has not disconnected, the associated hold magnet, upon releasing, completes the circuit for operating the associated line relay L(6). That relay L(6) will operate before the slow-to-release lock-out relay LO(6) can release thereby to lock relay LO(6) operated over contact 3 of that relay LO(6) and contact 3 of relay L(6) to ground through resistance LR(6). Thus the called subscriber's line will be placed in a locked-out condition until he disconnects.

REVERTING CALL—SAME LINE

The disclosure is arranged to handle revertive calls upon the dialing of the digit 9 followed by the ringing code of the called subscriber.

Figure 7:
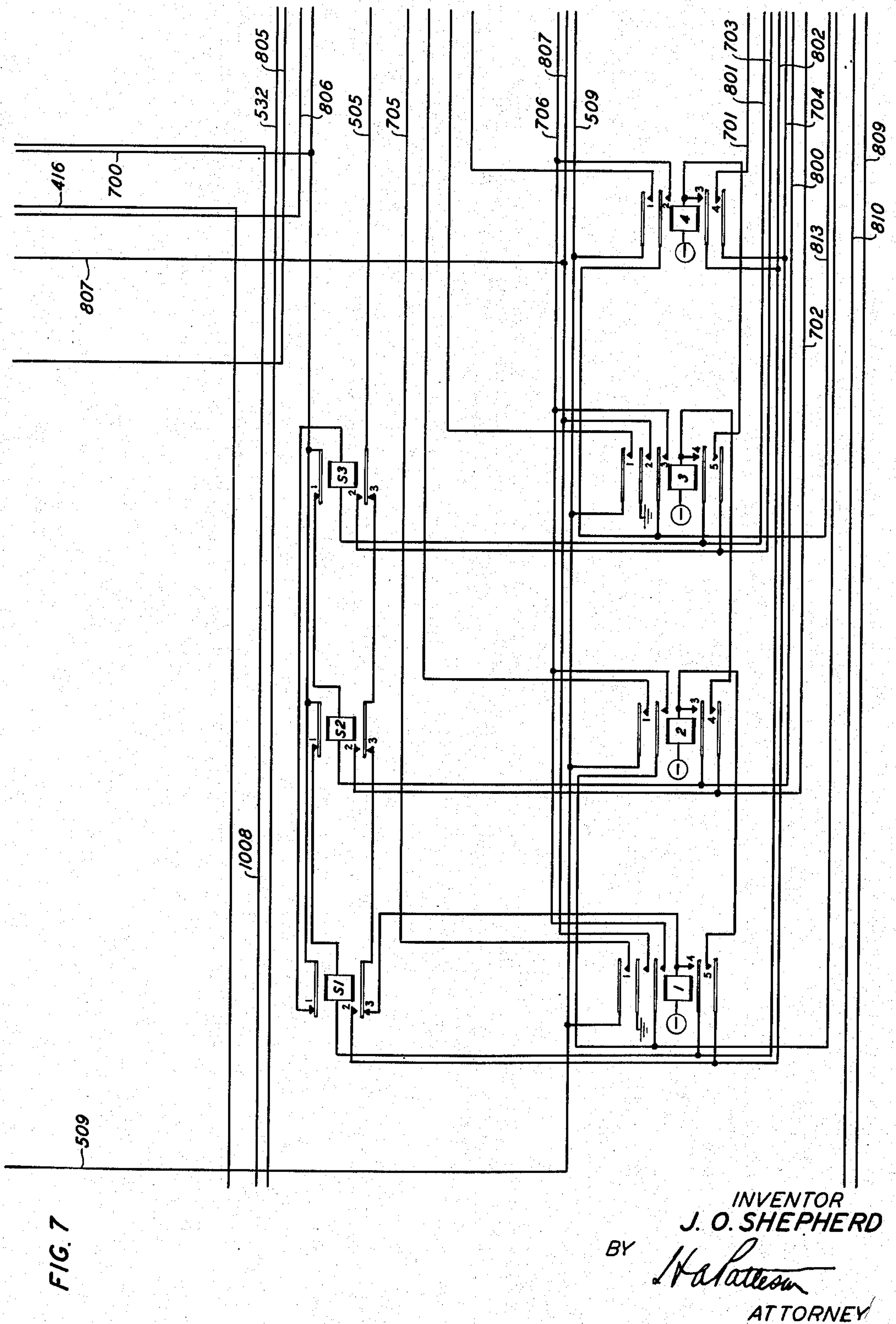
Figure 8:
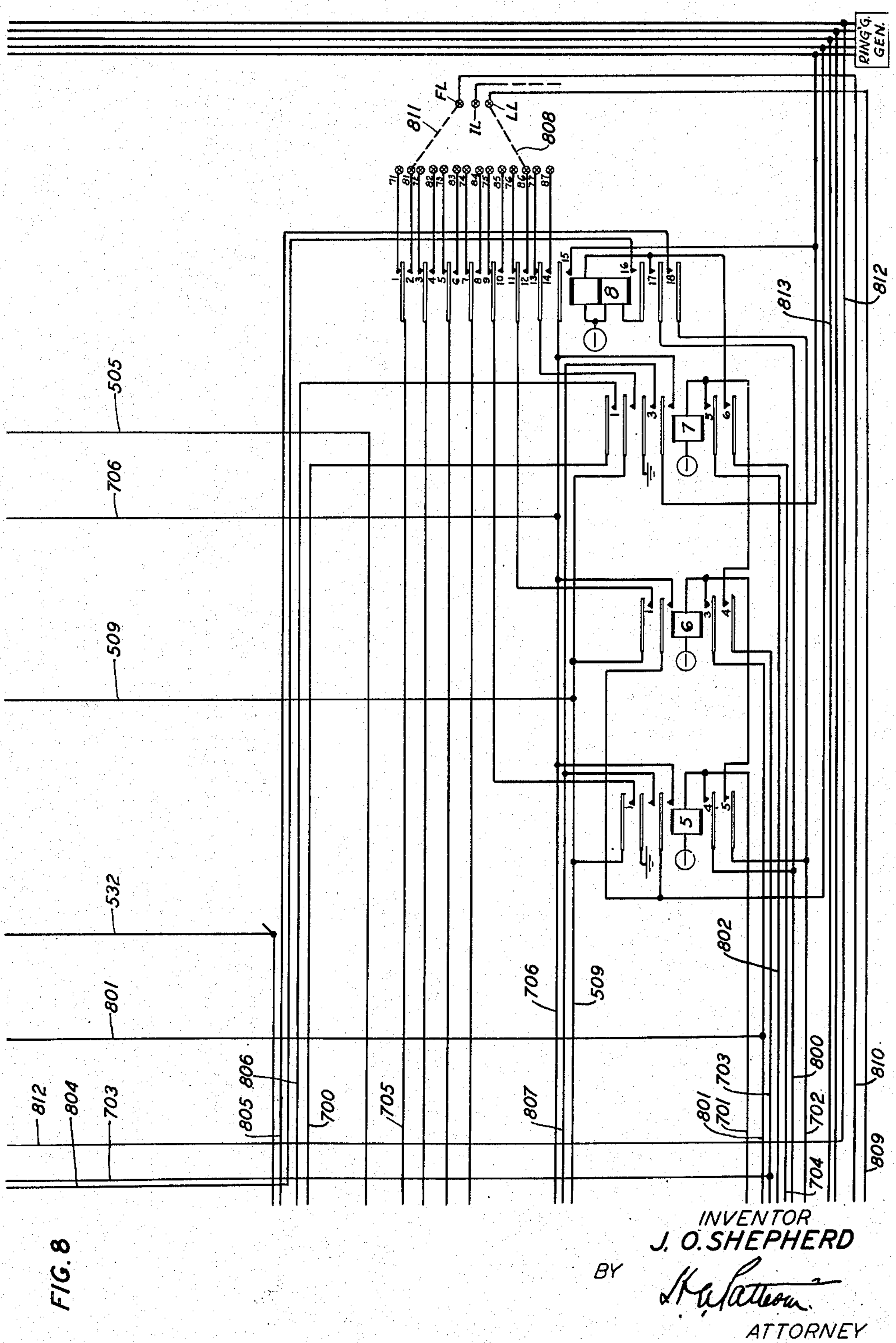
Figure 9:
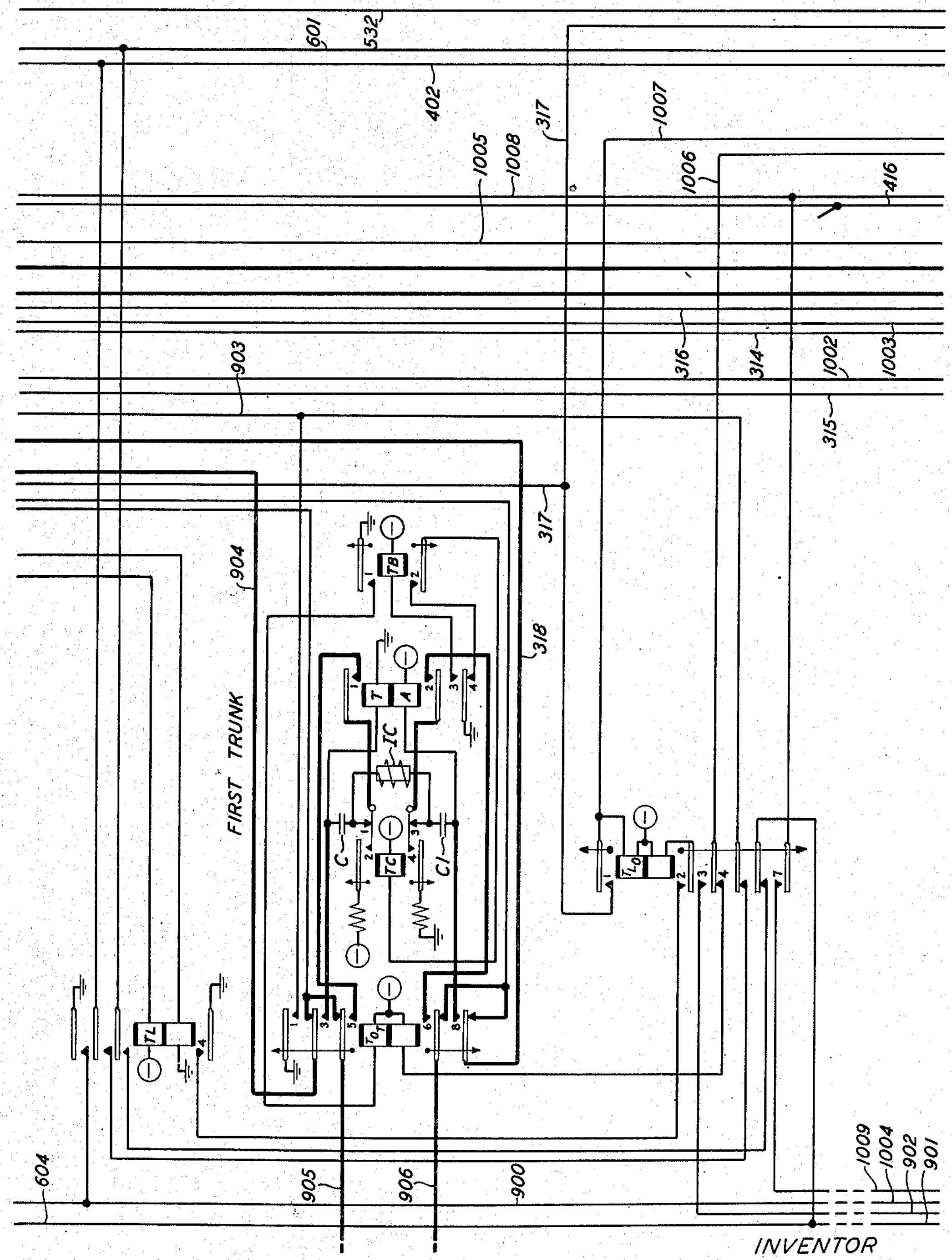
Figs. 9 and 10 show respectively the line and supervisory circuits for the first and last trunk lines; and, Fig. 2 illustrates how the other figures may be arranged to disclose the present invention as embodied in the disclosed telephone system.

On the first digit 9, the counting chain of Figs. 7 and 8 will be counted up, as previously described, to operate relays S3(7), RC9(5) and SW(4). Immediately at the end of the first digit 9, the following relays will be operated as above described: lock-out relay LO(6) of the calling first line where it is assumed that subscriber 300 is calling subscriber 313; hold magnet H(3) of the first line; link assignment relay LI(4) under the assumption that the link was idle when the call was made; and, relays A(4), B(4), DT(4), C(4), SW(4) and C2(5) of the link circuit. Upon the release of relays C(4) and C2(5) during the interdigital pause, relay DT(4) operates as before releasing relay SW(4), and a circuit is partially completed for operating the busy relay BSY(5) if the second or ringing code digit dialed is greater than 9, which could be only an error. Such circuit would, under such circumstances during the ninth open loop period, be traced from ground on conductor 505, contact 3 of relay S3(7), contact 2 of relay S2(7), conductor 702, contact 18 of relay 8(8), conductor 805, contact 10 of relay DT(4), conductor 419, to battery through the lower winding of relay BSY(5).

It will be assumed that the ringing code required to call the called party 313 is the digit 4. Upon the dialing of the digit 4, relay A(4) releases and reoperates to follow the open loop pulses as before and relays C(4) and C2(5) reoperate and remain operated for the duration of the digit as previously described. Relay C2(5), upon operating, reoperates relay SW(4) in a circuit extending from ground, over contact 6 of relay C2(5), contact 3 of relay RC9(5), conductor 525, contact 8 of relay DT(4), to battery through the upper winding of relay SW(4), which relay operates and locks as before, in turn locking relay C2(5) operated. Relay C2(5), remaining operated, locks the digit 4 in the counting chain where relays S1(7) and 4(7) remain operated after the end of the ringing code digit. Relay SW(4) applies ground over its contact 12, conductor 420, and contact 8 of relay RC9(5), to the off-normal ground conductor 506 to insure a holding condition in the link circuit during ringing.

At the end of the dialing of the second digit 4, upon the release of relay C(4) with relay C2(5) held operated as described, relay BSY(5) is operated to apply a busy signal to the calling line as a directive to the calling party to disconnect preparatory to setting up the ringing condition. Relay BSY(5) operates in a circuit extending from ground, over contact 2 of relay C(4), conductor 411, contact 4 of relay C2(5), conductor 510, contact 12 of relay DT(4), contact 2 of relay SW(4), conductor 421, contact 2 of relay RC9(5) to battery through the lower winding of relay BSY(5). Relay BSY(5) locks over its contact 4, conductor 515, to ground over contact 5 of relay B(4). Relay BSY(5) applies busy tone to the calling line as previously described. At its contact 6, relay BSY(5) opens the pulsing conductor 505 to prevent the opening of the line loop during ringing from being interpreted by the counting chain as a pulse of an additional digit.

*Ringing called party*

When the calling party disconnects, relay A(4) releases reoperating relay C(4) and starting the release of relay B(4), off-normal ground being maintained on conductor 506, as previously described, under the control of relays SW(4) and RC9(5), relay RC9(5) remaining operated after the release of relay B(4) in a circuit over contact 7 of relay RC9(5), contact 4 of relay 0(5), contact 2 of relay C2(5), conductor 526, to ground at contact 6 of relay D(4). When relay B(4) releases it releases relay BSY(5) before relay C(4) releases.

At the beginning of the ringing cycle, as previously described, ground is applied to conductor 812 and is extended over contact 12 of relay RC9(5), conductor 527, contact 6 of relay B(4), contact 3 of relay SW(4), contact 7 of relay DT(4), contact 6 of relay C(4), conductor 417, contact 8 of relay C2(5), contact 3 of relay PU(5), to battery through the winding of relay PU(5). Relay PU(5) operates and locks to off-normal ground on conductor 506 over its contact 4. Relay PU(5), upon operating, operates the cut-through relay CT(4) in order to connect the outgoing tip and ring conductors 519 and 523 to the incoming tip and ring conductors 404 and 306 so that the latter will carry the ringing code. The circuit may be traced from ground, over contact 11 of relay RC9(5), contact 5 of relay PU(5), conductor 528, to battery through the upper winding of relay CT(4), which relay operates and locks through its lower winding, its contact 9, its contact 8, conductor 529, to ground over contact 10 of relay RC9(5). The latter ground on conductor 529 is extended to the sleeve conductor 403 of the incoming unit of the link to hold the calling line hold magnet H(3) operated, ground on conductor 529 being so applied over contact 2 of the time-out relay TO(4) and contact 2 of relay LI(4). Relay LI(4) is held operated to the same ground over contact 4 of relay CT(4).

Ringing code 4, as arranged, requires ringing on the ring side of the line so relay TP(5) will not be operated, as before, to reverse the ringing circuits. The ringing circuit extends from generator ground on conductor 522, through the lower winding of relay RCO(5), contact 2 of relay RCI(5), contact 1 of relay TP(5), contact 2 of relay PU(5), contact 1 of relay RCO(5), conductor 519, contact 2 of relay CT(4), conductor 404, cross-point contact 1 of the cross bar switch, to the tip conductor 304 of the calling line. The ring conductor of the calling line is connected over cross-point contact 2, conductor 306, contact 12 of relay CT(4), conductor 523, contact 7 of relay RCO(5), contact 1 of relay PU(5), contact 3 of relay TP(5), contact 4 of relay RCI(5), conductor 706, contact 2 of relay 4(7), conductor 813 to the ringing code generator.

At the end of each ringing cycle relay RCI(5) is operated momentarily by a short impulse of ground from the reverting call impulse generator over conductor 530, contact 7 of relay PU(5), contact 5 of relay RC9(5), to battery through the upper winding of relay RCI(5). Relay RCI(5) operates and remains operated beyond the duration of the impulse, due to its slow releasing character, for a length of time short of the end of the ringing cycle, whereupon relay RCI(5) releases to permit the next ringing cycle to go over the line as above described, the locking circuit for relay RCI(5) being open at contact 14 of relay RC9(5). During the time relay RCI(5) is operated continuous ringing is applied to the opposite side of the calling line (tip side) to give the calling subscriber, if his ringer is connected to that side, an opportunity to know that the called party is being signaled and an opportunity to know when that party answers, the latter causing the cessation of ringing as previously described. The previous ringing ground applied to the tip side of the line over contact 2 of relay RCI(5) is replaced by continuous ringing voltage over conductor 531 and contact 3 of relay RCI(5). The previous code ringing voltage applied to the ring side of the line over contact 4 of relay RCI(5) is replaced by ringing ground over conductor 522, lower winding of relay RCO(5) and contact 5 of relay RCI(5).

This ringing of the called subscriber's code on the ring side of the line followed, near the end of the ringing cycle, by a short ringing on the tip side of the line continues until the called subscriber answers, or until the calling subscriber disconnects to release the link.

*Called party answers*

When the called party answers, the ringing cut-off relay RCO(5) is operated over the direct-current bridge of the line at the called party's substation in a circuit extending from ground on conductor 522, through the lower winding of relay RCO(5), contact 2 of relay RCI(5), thence over the line as previously traced for the ringing current, back over contact 4 of relay RCI(5), and over conductor 706 to the code generator. Relay RCO(5) locks over its contact 3 to off-normal ground on conductor 506. Relay RCO(5), upon operating, disconnects, at its contacts 1 and 7, the ringing circuit from the line, and operates relay D(4) in a circuit extending from ground, through the upper winding of relay D(4), conductor 516, contact 2 of relay RCO(5), conductor 519, contact 2 of relay CT(4), conductor 404, cross-point contact 1, tip conductor 304, over the closed line loop, ring conductor 305, cross-point contact 2, conductor 306, contact 12 of relay CT(4), conductor 523, contact 6 of relay RCO(5), conductor 524, to battery through the lower winding of relay D(4).

Relay D(4), upon operating, releases relay RC9(5) which, in turn, removes ground from the off-normal conductor 506 thereby releasing relays DT(4), SW(4), C2(5), PU(5), RCO(5), SI(7), 4(7), CT(4), LI(4), and releasing itself, restoring the link to normal. The release of relay RC9(5) also removes ground from the sleeve conductor 403 of the switch unit thereby permitting hold magnet H(3) to release, in turn opening the cross-point contacts. Release of hold magnet H(3) reoperates the line relay L(6) of the called line thereby locking operated the associated lockout relay LO(6) as previously described.

As soon as the calling party realizes that the ringing has been stopped he will lift his receiver and may hold a conversation with the called party, talking battery being supplied to the line over the contacts 2 and 3 of hold magnet H(3) and conductors 600 and 301 from the windings of relay L(6).

As soon as all parties on the line disconnect, relay L(6) will release, thereby releasing relay LO(6) to again prepare this line circuit such that it may again seize an idle link circuit.

TRUNK CALL—INCOMING

As shown, there are four trunks terminating in four verticals of the switching unit. These trunks, of which only the first and last of the group are shown, may also terminate in distant manual or automatic offices and may handle incoming or outgoing calls from or to such office. Such office may switch such trunks to other switching units in other communities, or to other exchanges.

A call incoming over one of such trunks is handled at the switching unit similarly to a call originating on a line appearing in a vertical of such unit.

Figure 10:
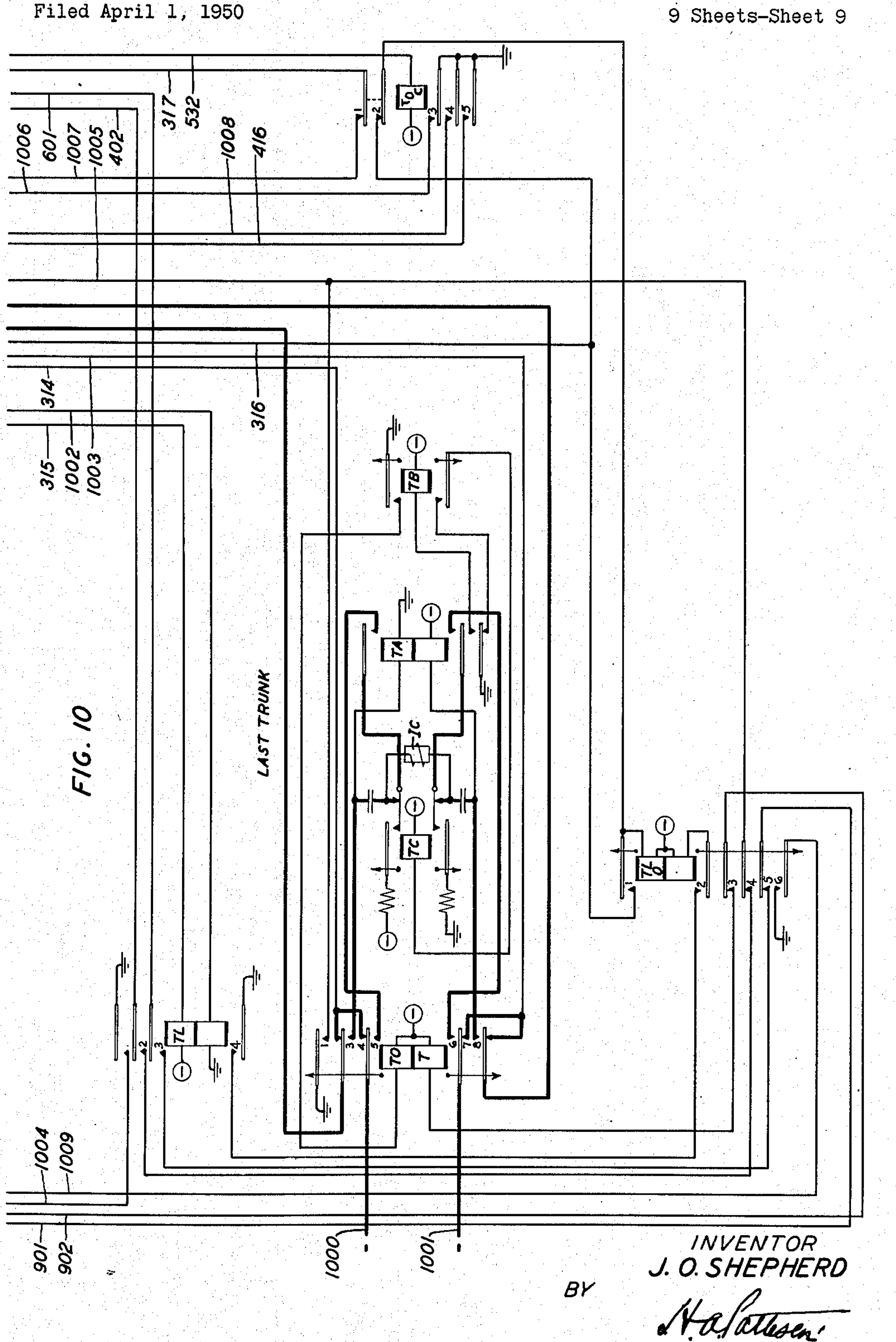

It will be assumed that a call is incoming over the last trunk, circuits of which appear in Fig. 10. When the trunk conductors 1000 and 1001 are bridged to indicate an incoming call, the trunk line relay TL(10) operates in a circuit extending from ground, through the lower winding of relay TL(10), conductor 1002, contact 3 of the hold magnet H(3) associated with the last trunk, conductor 314, contact 4 of relay TOT(10), conductor 1000, over the closed loop of the trunk, back over conductor 1001, contact 7 of relay TOT(10), conductor 1003, contact 2 of hold magnet H(3), conductor 315, to battery through the upper winding of relay TL(10). Relay TL(10), upon operating, operates the line supervisory relay LS(6) in a circuit extending from ground, over contact 1 of relay TL(10), conductor 1004, conductor 900, to battery through the winding of relay LS(6), which relay operates, as previously described, to place any calling line on lock-out condition if such line should operate its line relay L(6) while relay LS(6) is operated. This prevents interference by local calling lines with the setting up of the presently considered incoming trunk call.

Relay TL(10), upon operating, completes a circuit for seizing an idle link circuit. Such circuit extends from ground, over the contact of relay LD(6), conductor 604, conductor 901, contact 5 of the trunk lock-out relay TLO(10), contact 3 of relay TL(10), to the start conductor 601, as in the previous case of a calling line, over contact 6 of the link assignment relay L1(4) if that link is idle, or over contact 7 of relay L1(4) to a corresponding contact 6 of the first released relay L–(4), conductor 400, to battery through the upper winding of relay RCI(5) of the idle link circuit to be seized.

When the link circuit is seized, just as was the case with the calling line previously described, the "in" select magnet IS(3) is operated to return ground over conductor 302, contact 4 of relay L1(4) and conductor 402 to operate the hold magnet of the calling trunk. Ground on conductor 402 extends over contact 2 of relay TL(10), contact 4 of relay TLO(10), conductor 1005, to battery through the winding of hold magnet H(3) associated with the calling trunk. Hold magnet H(3), upon operating, locks to sleeve ground over cross-point contact 15, releases relays TL(10) and LS(6), and extends sleeve ground over its contact 1, conductor 316, and contact 2 of the trunk-out control relay TOC(10), to battery through the upper winding of relay TLO(10). Relay TLO(10) operates, locking over its contact 1 to ground on conductor 316 just traced.

Subsequent circuit operation is the same as in the case, above described, of a local call within the same switch unit, line relay TL(10) and lock-out relay TLO(10) of the incoming trunk line circuit corresponding to and performing similar functions as line relay L(6) and lock-out relay LO(6) of the calling line circuit. The link will count and register the called digits and will, responsive thereto, set up the interconnection over its "in" and "out" units as has been described above.

No provision is made to lock out simultaneous incoming trunk calls because it is assumed that only one such call will be made at any given time under the control of an operator or automatic central office equipment.

In the event that the link circuit times out, as has been described with reference to tube TT(4) and relay TO(4), hold magnet H(3) will be released reoperating the trunk line relay TL(10). Since relay TLO(10) is slow releasing, the reoperation of relay TL(10) will lock relay TLO(10) operated before relay TLO(10) can release upon the release of hold magnet H(3). This locking circuit, under those circumstances, would extend from ground, over contact 4 of relay TL(10) and contact 2 of relay TLO(10) to battery through the lower winding of relay TLO(10). Relay TLO(10) would retain the trunk line circuit locked out until the incoming trunk line was opened long enough to permit relay TLO(10) to release. As was the case with the lock-out relay LO(6) of a calling line circuit, relay TLO(10) prevents that particular incoming trunk from seizing an idle link until the trunk has been cleared.

At the end of the conversation when both parties disconnect all circuits revert to normal in the same manner as has been described heretofore.

TRUNK CALL—OUTGOING

An outgoing trunk call arises when one of the subscribers whose lines terminate in verticals of the switch unit desires an interconnection with a subscriber whose line is accessible through only a central office, either manual or automatic.

*Seizing an idle link*

It will be assumed that subscriber 300 desires such an interconnection. As will be recalled, immediately after the dialing by subscriber 300 of the first digit of the called number, which in the present case is zero, the following relays and magnets are operated: hold magnet H(3); lock-out relay LO(6); link assignment relay L1(4); relay A(4); off-normal relay B(4); relay SW(4); relay 0(5) and relays C(4) and C2(5).

When relay 0(5) operates, a circuit is completed for operating the line delay relay LD(6) to open the start circuit over conductor 601 for all calling lines and all calling trunks. This circuit may be traced from ground, over contact 1 of relay C(4), conductor 415, contact 1 of relay C2(5), contact 6 of relay 0(5), conductor 416, to battery through the winding of relay LD(5), which relay thereupon operates to open, at its contact, the previously traced link seizure start circuit over conductor 601.

When relays C(4) and C2(5) release after the end of first digit zero, the select magnet OS(3) of the "out" unit of the first link circuit is operated to prepare for the interconnection of the link with an idle trunk circuit. Select magnet OS(3) operates in a circuit extending from ground, over contact 5 of relay C2(5), contact 2 of relay BSY(5), contact 8 of relay 0(5), conductor 511, contact 10 of relay CT(4), conductor 414, to battery through the winding of select magnet OS(3). Relay DT(4) is also operated by relay SW(4) operated and relays C(4) and C2(5) released as previously described.

*Seizing an idle trunk*

Select magnet OS(3), upon operating, returns ground over its contact, conductor 509, contact 7 of relay 0(5), conductor 532, to battery through the trunk-out control relay TOC(10), which operates. This relay TOC(10) is common to all of the trunks terminating at the switching unit.

Relay TOC(10), upon operating, provides a locking circuit for relay LD(6) from ground, over contact 5 of relay TOC(10), to conductor 416. Relay TOC(10) operates the trunk-out relay TOT(9) or TOT(10), etc. of the first idle trunk in a circuit extending from ground, over contact 3 of relay TOC(10), conductor 1006, contact 4 of relay TLO(9) (assuming the first trunk to be idle), to battery through the lower winding of relay TOT(9) of the first trunk. If the first trunk had been busy relay TLO(9) thereof would have been operated, whereupon the above circuit would have extended over contact 3 of relay TLO(9), front contacts of all other operated relays TLO(—), conductor 902, contact 3 of relay TLO(10) of the last trunk (or a back contact of the first idle trunk) to battery through the lower winding of the relay TOT(—) of that first idle trunk, such as relay TOT(10). It will be assumed that the first trunk is idle and that relay TOT(9) thereof operates.

Relay TOT(9), upon operating, operates the associated hold magnet H(3) from ground, over contact 1 of relay TOT(9), conductor 903, to battery through the winding of hold magnet H(3) of the first trunk. Hold magnet H(3) operates to connect the trunk with the link over the cross-point contacts 9 to 12. The operating ground for hold magnet H(3) is extended from conductor 903, over cross-point contact 11, to the sleeve conductor 308 of the "out" unit of the link circuit. Upon the closing of the cross-points, relay CT(4) is operated in a circuit extending from ground, over cross-point contact 12, conductor 310, contact 2 of relay 0(5), contact 1 of relay BSY(5), contact 10 of relay C2(5), conductor 528, to battery through the upper winding of relay CT(4). Relay CT(4) operates to interconnect the "in" and "out" units of the link circuit and to disconnect any elements of the link circiut bridging this talking path. The ground on sleeve conductor 308 is extended over contact 1 of the time-out relay TO(4), contacts 6 and 8 of relay CT(4), conductor 529, contact 2 of relay TO(4), over contact 2 of relay LI(4), to sleeve conductor 403 of the "in" unit of this link. Relay CT(4) locks over its contact 9 to this sleeve ground on conductor 529 and locks relay LI(4) operated over contact 4 of relay CT(4) to sleeve ground on conductor 529.

The operation of relay CT(4) releases relay A(4) which in turn releases the off-normal relay B(4). Relay B(4), upon releasing, releases all operated relays in the link circuit except relays CT(4) and LI(4), which, as above mentioned, are locked to sleeve ground under the control of relay TO(4). The operation of relay CT(4) releases select magnet OS(3) and the release of select magnet OS(3) and relay 0(5) releases the trunk-out control relay TOC(10).

Upon the release of relay TOC(10), lock-out relay TLO(9) of the seized trunk is operated in a circuit extending from ground on the sleeve conductor 308 of the link, over cross-point contact 11, contact 1 of hold magnet H(3), conductor 317, contact 1 of relay TOC(10), conductor 1007, to battery through the upper winding of relay TLO(9). Relay TLO(9) operates and locks over its contact 1 to ground on conductor 317 independently of relay TOC(10). Relay TLO(9) transfers, at its contact 3, as above described, the start circuit to the next idle trunk circuit.

Relay TA(9) operates over the calling line loop in a circuit extending from ground, through the upper winding of relay TA(9), contact 3 of relay TOT(9), tip conductor 904 of the trunk line circuit, cross-point contact 9, tip conductor 519 of the link "out" unit, contact 2 of relay CT(4) of the link, tip conductor 404 of the link "in" unit, cross-point contact 1, tip conductor 304 of the calling line circuit, over the calling line loop, ring conductor 305 of the calling line circuit, cross-point contact 2, ring conductor 306 of the link "in" unit, contact 12 of relay CT(4) of the link, ring conductor 523 of the link "out" unit, cross-point contact 10, ring conductor 318 of the trunk line circuit, contact 8 of relay TOT(9), to battery through the lower winding of relay TA(9). Relay TA(9), upon operating, operates relay TB(9) in an obvious circuit over contact 3 of relay TA(9). Relay TB(9), upon operating, provides a locking circuit over contact 1 of relay TB(9) for relay TOT(9) which is effective before the operation of relay TLO(9) which opened the operating circuit for relay TOT(9).

*Central office seizure*

Relay TA(9), upon operating, completes a bridge across the outgoing tip and ring trunk conductors 905 and 906 from conductor 905, over contact 5 of relay TOT(9), contact 1 of relay TA(9), contact 1 of relay TC(9), through induction coil IC(9), contact 3 of relay TC(9), contact 2 of relay TA(9), contact 6 of relay TOT(9), to conductor 906. If the distant termination of the trunk conductors 905 and 906 is in a switchboard at a manual office, this bridge is effective to light a lamp thereat. If the distant termination is in an automatic office, this bridge is effective to operate an incoming selector or line finder, etc., thereat which may return dial tone to the calling subscriber as a directive to dial the number of the called party. In the event of a manual office, as will be appreciated, verbal directions to an operator will supply the desired called party's designation.

*Dialing called number*

If the central office is an automatic exchange, the calling subscriber will be connected thereto, as above, whereupon he must dial the called number. Upon the first open line loop during the first pulse of the first digit, relay TA(9) releases. Relay TB(9) remains operated during the releases of relay TA(9) during pulses of a digit. A circuit is completed for operating relay TC(9) from ground, over contact 4 of relay TA(9), contact 2 of relay TB(9), to battery through the winding of relay TC(9). Relay TC(9) operates and remains operated until relay TA(9) reoperates for a relatively long pause between digits whereupon relay TC(9) releases.

Relay TC(9), upon operating, substitutes, over its contacts 2 and 4, resistance battery and resistance ground for the induction coil IC(9) to improve the pulsing range as received at the central office, it being assumed that a pulsing relay thereat has a first winding serially connected to ground and to conductor 905, and a second winding serially connected to battery and conductor 906.

*Answer of called party*

The automatic equipment at the central office, or the manual operator thereat, will effect the necessary switching operations to interconnect the calling subscriber 300 with the desired called party in accordance with the called number. The parties may hold a conversation over the circuit including conductors 905 and 906, contacts 5 and 6 of relay TOT(9), contacts 1 and 2 of relay TA(9), contacts 1 and 3 of relay TC(9), condensers C(9) and C1(9), contacts 3 and 8 of relay TOT(9), conductors 904 and 318, cross-point contacts 9 and 10, conductors 519 and 523, contacts 2 and 12 of relay CT(4), conductors 404 and 306, cross-point contacts 1 and 2, and conductors 304 and 305.

*Calling subscriber disconnects*

Since a disconnect only by the called party will not control the link and associated line and trunk circuits, it will be assumed that the calling subscriber 300 disconnects first. The opening of the calling line circuit releases relays TA(9) and TB(9). Relay TB(9), upon releasing, releases relay TOT(9), which is slow to release to permit the called party to disconnect before the trunk line relay TL(9) is reconnected to the trunk upon the subsequent release of hold magnet H(3).

Assuming that the called party disconnects prior to the release of relay TOT(9), the release of the latter removes, at its contact 1, the sleeve ground from the switching unit, thereby releasing hold magnets H(3) of the trunk line circuit and H(3) of the calling line circuit, relays CT(4) and L1(4) of the link, and the trunk lock-out relay TLO(9) of the trunk line circuit to restore all apparatus to normal.

If the called subscriber has not disconnected before relay TOT(9) releases, the trunk line relay TL(9) will be operated as previously described in connection with an incoming trunk call, and relay TLO(9) is sufficiently slow to release such that it will be locked to ground over contact 4 of relay TL(9), thereby locking out this trunk circuit until the called subscriber does disconnect.

*All trunks busy*

If all trunks were busy when the link circuit attempted to seize an idle one, each of the lock-out relays, such as TLO(9) and TLO(10) would have been operated and a circuit would thereupon have been completed, before the release of relay C(4) of the link, from ground, over contact 6 of relay TLO(10), conductor 1009, over front contacts of the intermediate trunk lock-out relays (not shown), contact 7 of relay TLO(9), conductor 1008, contact 7 of relay C(4), conductor 422, contact 3 of relay 0(5), to battery through the lower winding of relay BSY(5), which would have operated to apply busy tone to the calling subscriber's line.

When the trunk-out control relay TOC(10) operated as an incident to seizure of an idle trunk, this busy condition is simulated to prevent double connections. The simulated busy condition is effected by ground, over contact 4 of relay TOC(10) to conductor 1008 as above traced.

It is to be understood that the above-described arrangements are merely illustrative of the application of the principles of the invention. Numerous other arrangements may be devised by those skilled in the art without departing from the spirit and scope of the invention.

What is claimed is:

1. In a telephone system, a cross-bar switch, telephone lines, link circuits, a start circuit, means responsive to a call on one of said lines to close said start circuit, means controlled over said start circuit for operating said switch to connect an idle link with said calling line, first circuit means operative when all links are busy to open said start circuit, and second circuit means responsive to the operation of said first circuit means to hold said start circuit open to said calling line under the control of said calling line.

2. In a telephone system, a cross-bar switch, telephone lines, line circuits for said lines, link circuits, said line circuits and said link circuits terminating on said switch, a start circuit associated with said ilnes and with said links, means in each line circuit responsive to a call on said line to close said start circuit, means in each link circuit controlled over said start circuit for operating said switch to connect an idlle link with said calling line, first circuit means associated with said links and operative when all of said links are busy to open said start circuit, and second circuit means associated with a calling line circuit and responsive to the operation of said first circuit means to hold said start circuit open to said calling line under the control of said calling line.

3. In a telephone system, a cross-bar switch, telephone lines, line circuits for said lines terminating on verticals of said switch, link circuits terminating on horizontals of said switch, a start circuit common to said line circuits and to said link circuits, means in each line circuit responsive to a calling condition thereon to close said start circuit, means in each link circuit controlled over said start circuit for operating said switch to connect an idle link with said calling line, first circuit means included in said links and operative when all of said links are busy to open said start circuit, and second circuit means included in each line circuit and responsive to the operation of said first circuit means to hold said start circuit open to said calling line under the control of said calling line.

4. In a telephone system, a cross-bar switch, telephone lines, line circuits for said lines terminating on verticals of said switch, link circuits terminating on horizontals of said switch, a start circuit common to said line circuits and to said link circuits, relay means in each line circuit responsive to a calling condition thereon to close said start circuit, relay means in each link circuit controlled over said start circuit for operating said switch to connect an idle link with said calling line, relay means in said links operative when all of said links are busy to open said start circuit, and relay means in a calling line circuit and responsive to the operation of the relay means in said links to hold said start circuit open to said calling line under the control of said calling line.

5. In a telephone system, a cross-bar switch, telephone lines, line circuits for said lines terminating on verticals of said switch, link circuits terminating on horizontals of said switch, a start circuit common to said line circuits and to said link circuits, a line relay in each line circuit responsive to a calling condition thereon to close said start circuit, relay means in each link circuit controlled over said start circuit for operating said switch to connect an idle link with said calling line, a lockout relay in each line circuit, relay means of said links operative when all of said links are busy to open said start circuit, and means including said lock-out relay of a calling line circuit operative in response to the operation of said relay means of said links and including said line relay of a calling line operative in response to a calling condition thereon effective to hold said start circuit open to said calling line under the control of said calling line.

6. In a telephone system, a cross-bar switch, telephone lines, link circuits, a start circuit including a portion thereof individual to each line, means responsive to a call on one of said lines to close said start circuit, means controlled over said start circuit for operating said switch to connect an idle link with said calling line, first circuit means operative when a plurality of lines call simultaneously, and second circuit means responsive to the operation of said first circuit means to open said start circuit for each one of said plurality of lines and to hold the portion of said start circuit open under the control of said calling line individual thereto.

7. In a telephone system, a cross-bar switch, telephone lines, line circuits for said lines, link circuits, said line circuits and said link circuits terminating on said switch, a start circuit including parts thereof common to said lines and to said links and including a portion thereof individual to each line, means in each line circuit responsive to a call on said line to close said start circuit, means in each link circuit controlled over said start circuit for operating said switch to connect an idle link with said calling line, first circuit means associated with said line circuits and operative when a plurality of lines call simultaneously, and second circuit means associated with said line circuits and responsive to the operation of said first circuit means to open said start circuit for each one of said plurality of lines and to hold the portion of said start circuit open under the control of said calling line individual thereto.

8. In a telephone system, a cross-bar switch, telephone lines, line circuits for said lines terminating on verticals of said switch, link circuits terminating in horizontals of said switch, a start circuit including parts thereof common to said line circuits and to said link circuits and including a portion thereof individual to each line circuit, means in each line circuit responsive to a calling condition thereon to close said start circuit, means in each link circuit controlled over said start circuit for operating said switch to connect an idle link with said calling line, first circuit means common to said line circuits and operative when a plurality of lines call simultaneously, and second circuit means in said line circuits responsive to the operation of said first circuit means to open said start circuit for each one of said plurality of lines and to hold the portion of said start circuit open under the control of said calling line individual thereto.

9. In a telephone system, a cross-bar switch, telephone lines, line circuits for said lines terminating on verticals of said switch, link circuits terminating on horizontals of said switch, a start circuit including parts thereof common to said line circuits and to said link circuits and including a portion thereof individual to each line circuit, relay means in each line circuit responsive to a calling condition thereon to close said start circuit, relay means in each link circuit controlled over said start circuit for operating said switch to connect an idle link with said calling line, relay means common to said line circuits and operative when a plurality of lines call simultaneously, and relay means in said line circuits responsive to the operation of said common relay means to open said start circuit for each one of said plurality of lines and to hold the portion of said start circuit open under the control of said calling line individual thereto.

10. In a telephone system, a cross-bar switch, telephone lines, line circuits for said lines terminating on verticals of said switch, link circuits terminating on horizontals of said switch, a start circuit including parts thereof common to said line circuits and to said link circuits and including a portion thereof individual to each line circuit, a line relay in each line circuit responsive to a calling condition thereon to close said start circuit, relay means in each link circuit controlled over said start circuit for operating said switch to connect an idle link with said calling line, a lock-out relay in each line circuit, relay means common to said line circuits and operated by said line relays when a plurality of lines call simultaneously, and relay means comprising said lock-out relays operated by said common relay means to open said start circuit for each one of said plurality of lines and to hold the portion of said start circuit open under the control of said calling line individual thereto.

11. In a telephone system, a cross-bar switch, telephone lines, link circuits, a start circuit including a portion thereof individual to each line, means responsive to a call on one of said lines to close said start circuit, means controlled over said start circuit for operating said switch to connect an idle link with said calling line, first circuit means operative when all links are busy to open said start circuit for each calling line, second circuit means operative when a plurality of lines call simultaneously to open said start circuit for each calling line, and third circuit means responsive to the operation of either of said first or said second circuit means to hold the portion of said start circuit open under the control of said calling line individual thereto.

12. In a telephone system, a cross-bar switch, telephone lines, line circuits for said lines, link circuits, said line circuits and said link circuits terminating on said switch, a start circuit including parts thereof common to said line circuits and to said link circuits and including a portion thereof individual to each line circuit, means in each line circuit responsive to a call on said line to close said start circuit, means in each link circuit controlled over said start circuit for operating said switch to connect an idle link with said calling line, means associated with said line circuits operative when a plurality of lines call simultaneously to open said start circuit for each calling line and to hold the portion of said start circuit open under the control of said calling line individual thereto, and means associated with each line circuit and with said links operative when all of said links are busy to open said start circuit for each calling line and to hold same open to said calling line under the control of said calling line.

13. In a telephone system, a cross-bar switch, telephone lines, line circuits for said lines terminating on verticals of said switch, link circuits terminating on horizontals of said switch, a start circuit including parts thereof common to said line circuits and to said link circuits and including a portion thereof individual to each line circuit, first relay means in each line circuit responsive to a calling condition thereon to close said start circuit, second relay means in each link circuit controlled over said start circuit for operating said switch to connect an idle link with said calling line, means including said first relay means operative when a plurality of lines call simultaneously to open said start circuit for each calling line and to hold the portion of said start circuit open under the control of said calling line individual thereto, and means including said first relay means and part of said second relay means operative when all of said links are busy to open said start circuit for each calling line and to hold same open to said calling line under the control of said calling line.

14. In a telephone system, a cross-bar switch, telephone lines, line circuits for said lines terminating on verticals of said switch, link circuits terminating on horizontals of said switch, a start circuit including parts thereof common to said line circuits and to said link circuits and including a portion thereof individual to each line circuit, a line relay in each line circuit responsive to a calling condition thereon to close said start circuit, relay means in each link circuit controlled over said start circuit for operating said switch to connect an idle link with said calling line, a lock-out relay in each line circuit, means including said line relays and said lock-out relays operative when a plurality of lines call simultaneously to open said start circuit for each calling line and to hold the portion of said start circuit open under the control of said calling line individual thereto, and means including said line relays and said lock-out relays and part of said relay means operative when all of said links are busy to open said start circuit for each calling line and to hold the portion of said start circuit open under the control of said calling line.

JUDSON O'D. SHEPHERD.

REFERENCES CITED

The following references are of record in the file of this patent:

UNITED STATES PATENTS

| Number | Name | Date |
|---|---|---|
| 1,690,210 | Stokely | Nov. 6, 1928 |
| 1,924,661 | Stehlik | Aug. 29, 1933 |
| 2,027,463 | Bascom | Jan. 14, 1936 |
| 2,400,061 | Abbott et al. | May 14, 1946 |
| 2,413,708 | Hersey | Jan. 7, 1947 |